Figure 1:
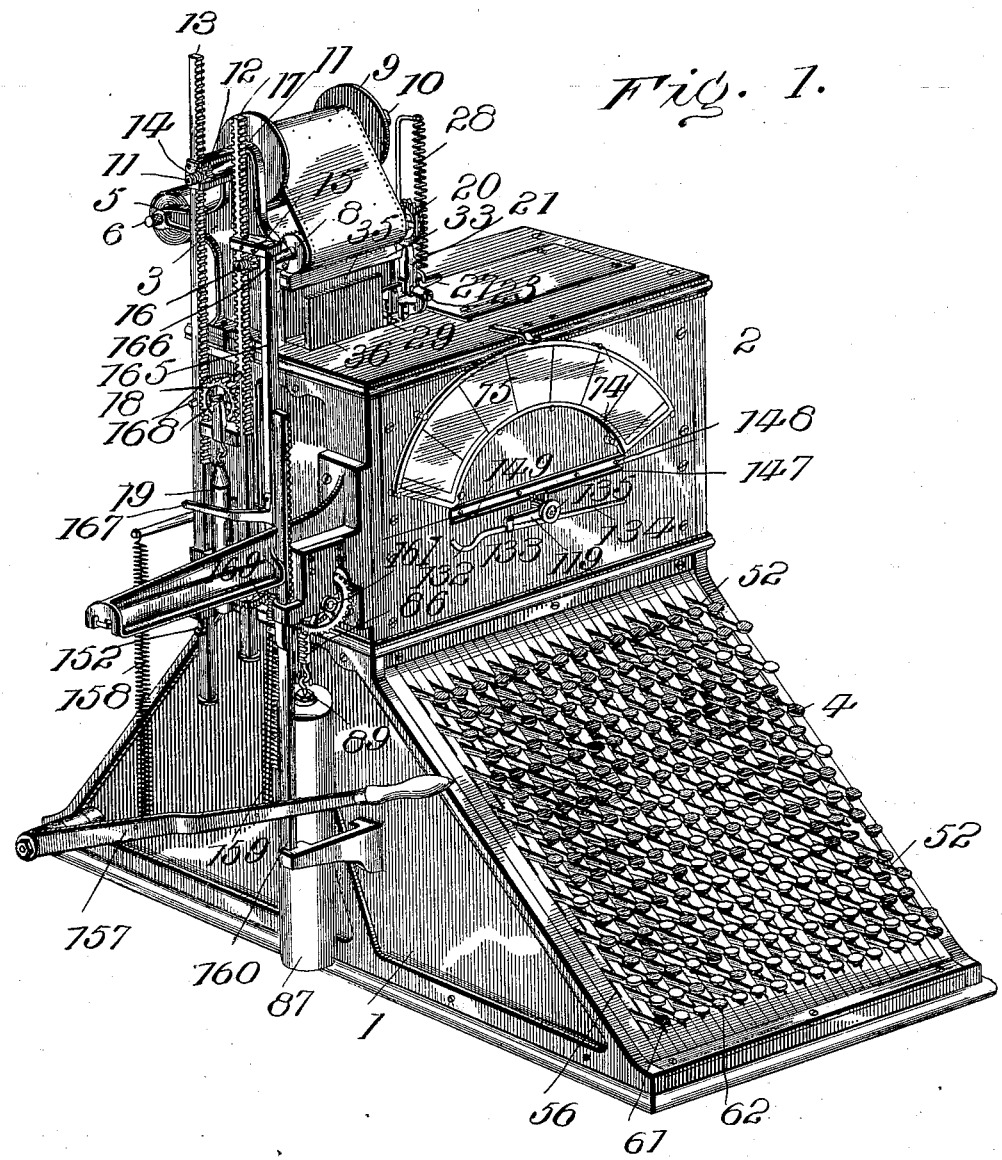

No. 628,620. Patented July 11, 1899.
J. S. BANCROFT & W. H. WOOD.
MACHINE FOR PERFORATING STRIPS FOR TYPE MACHINES.
(Application filed Mar. 21, 1899.)

(No Model.) 18 Sheets—Sheet 1.

Witnesses
Inventors:
John S. Bancroft &
William H. Wood
By Church & Church
Their Attorneys

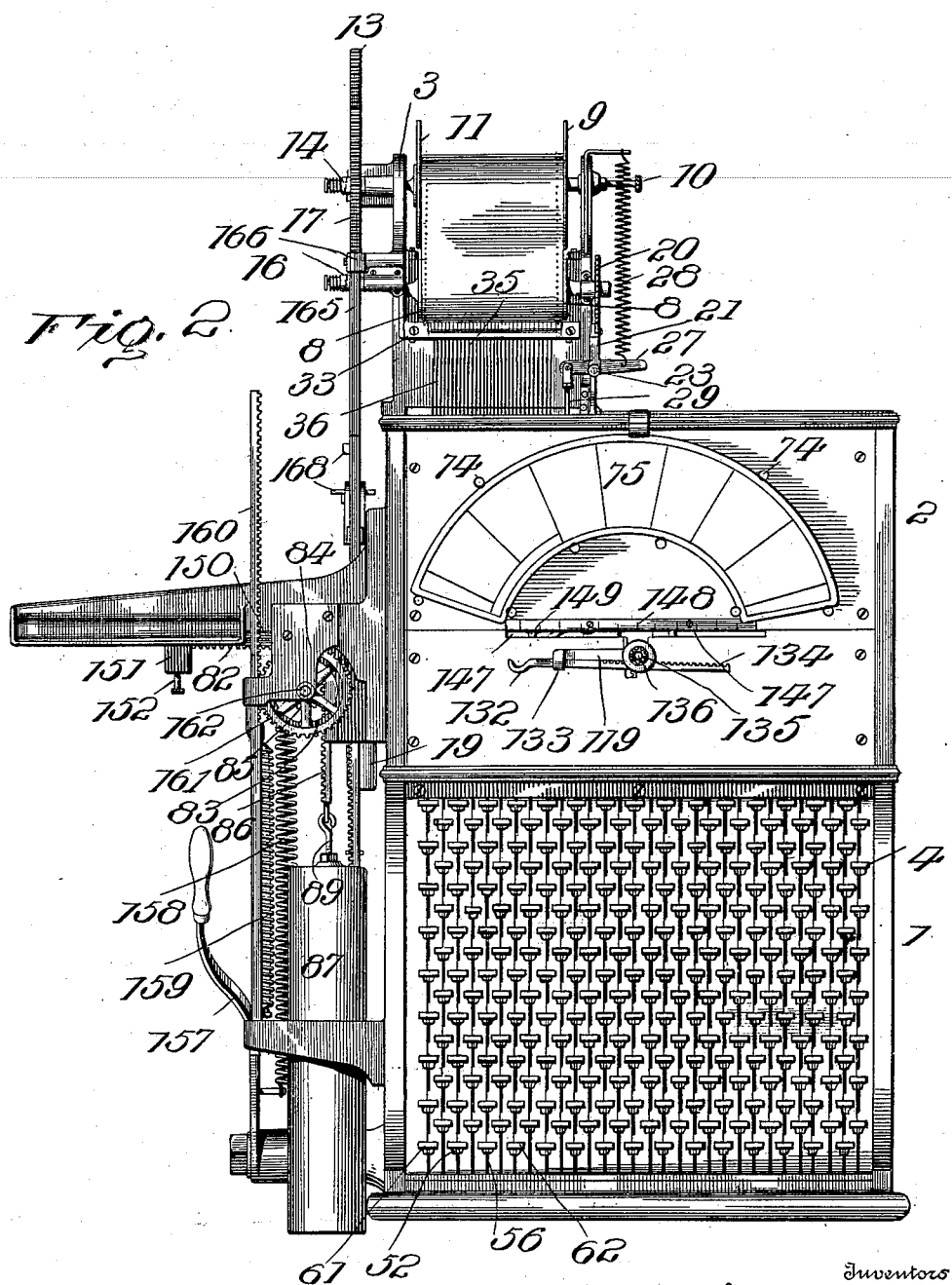

No. 628,620. Patented July 11, 1899.
J. S. BANCROFT & W. H. WOOD.
MACHINE FOR PERFORATING STRIPS FOR TYPE MACHINES.
(Application filed Mar. 21, 1899.)
(No Model.) 18 Sheets—Sheet 3.
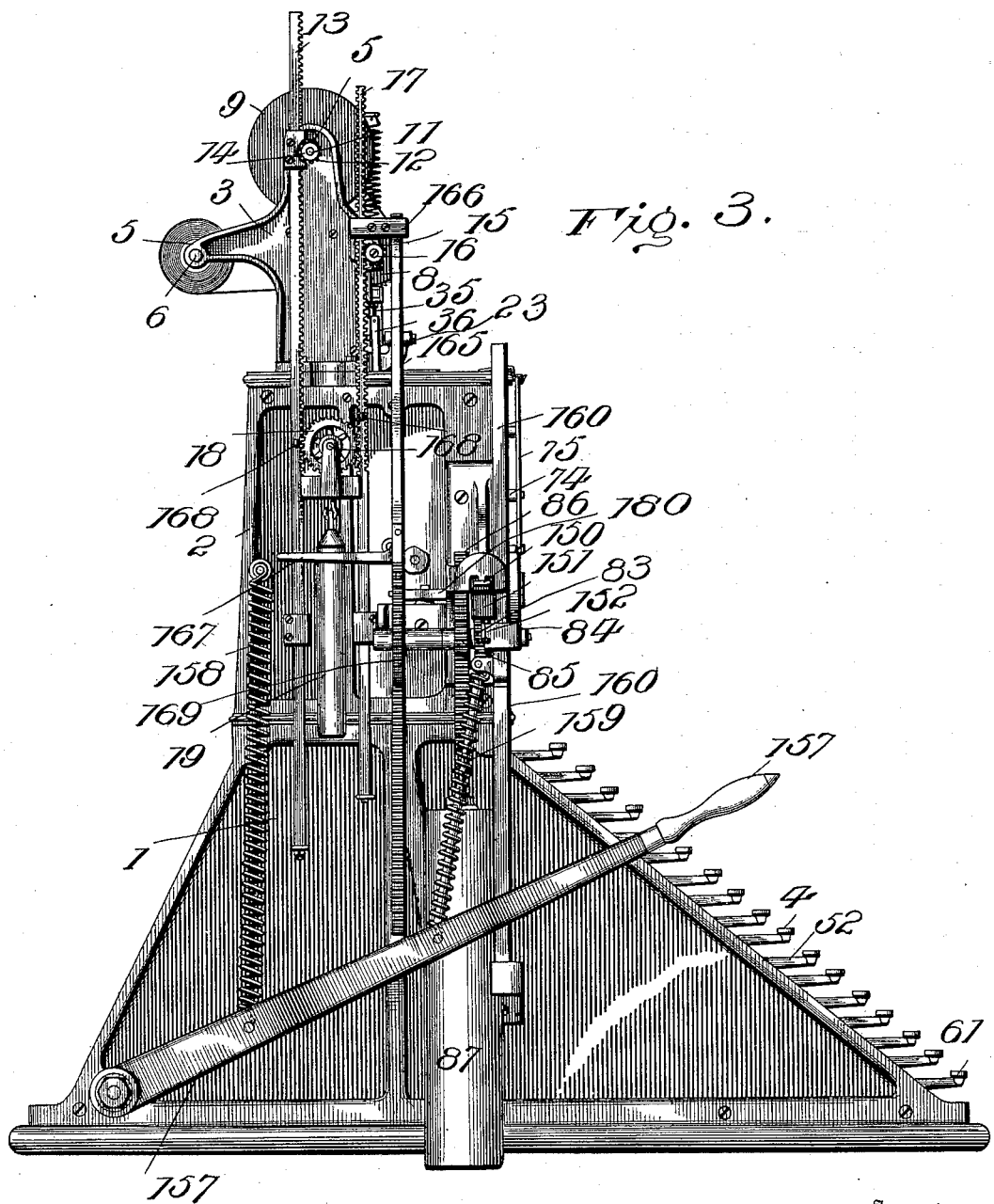

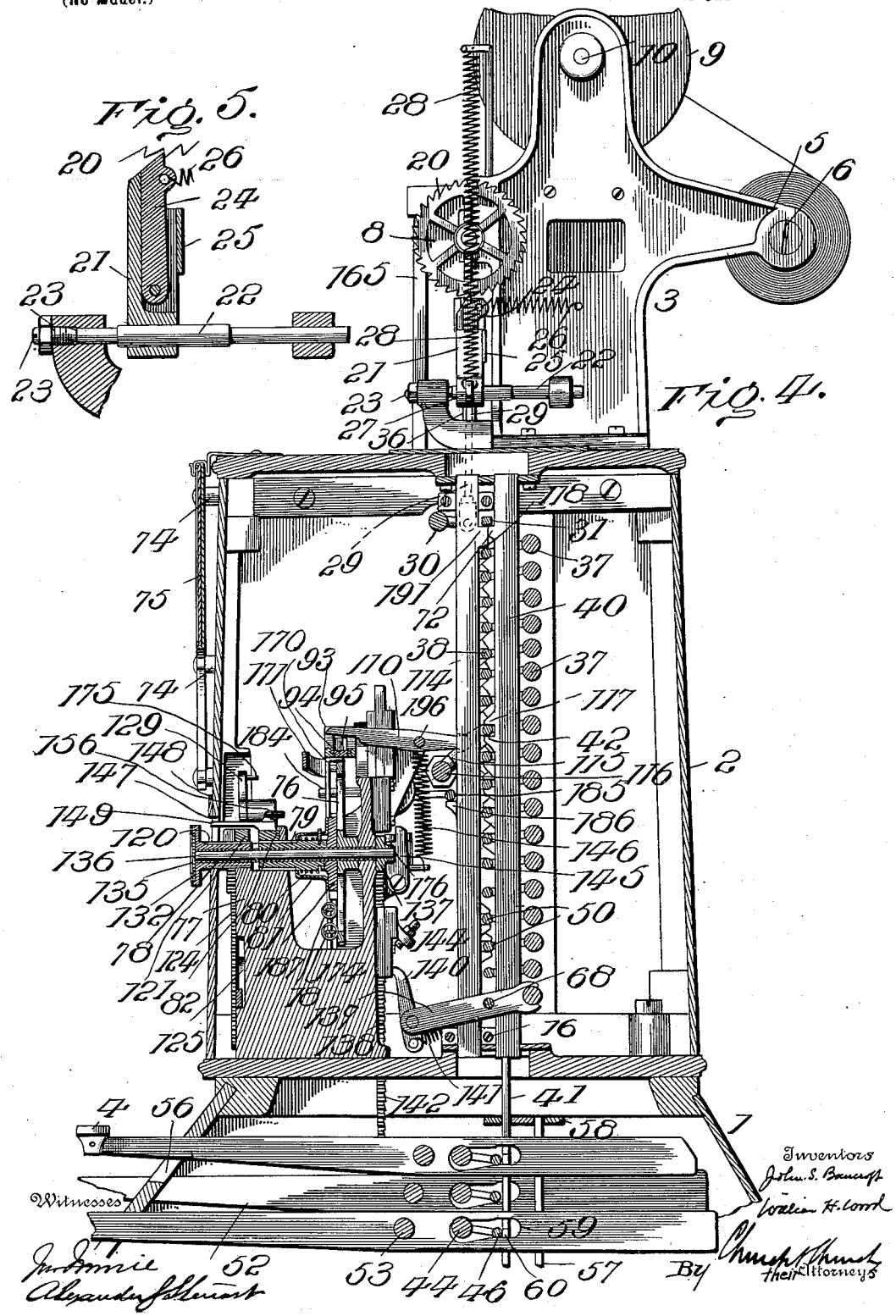

No. 628,620. Patented July 11, 1899.
J. S. BANCROFT & W. H. WOOD.
MACHINE FOR PERFORATING STRIPS FOR TYPE MACHINES.
(Application filed Mar. 21, 1899.)

(No Model.) 18 Sheets—Sheet 5.

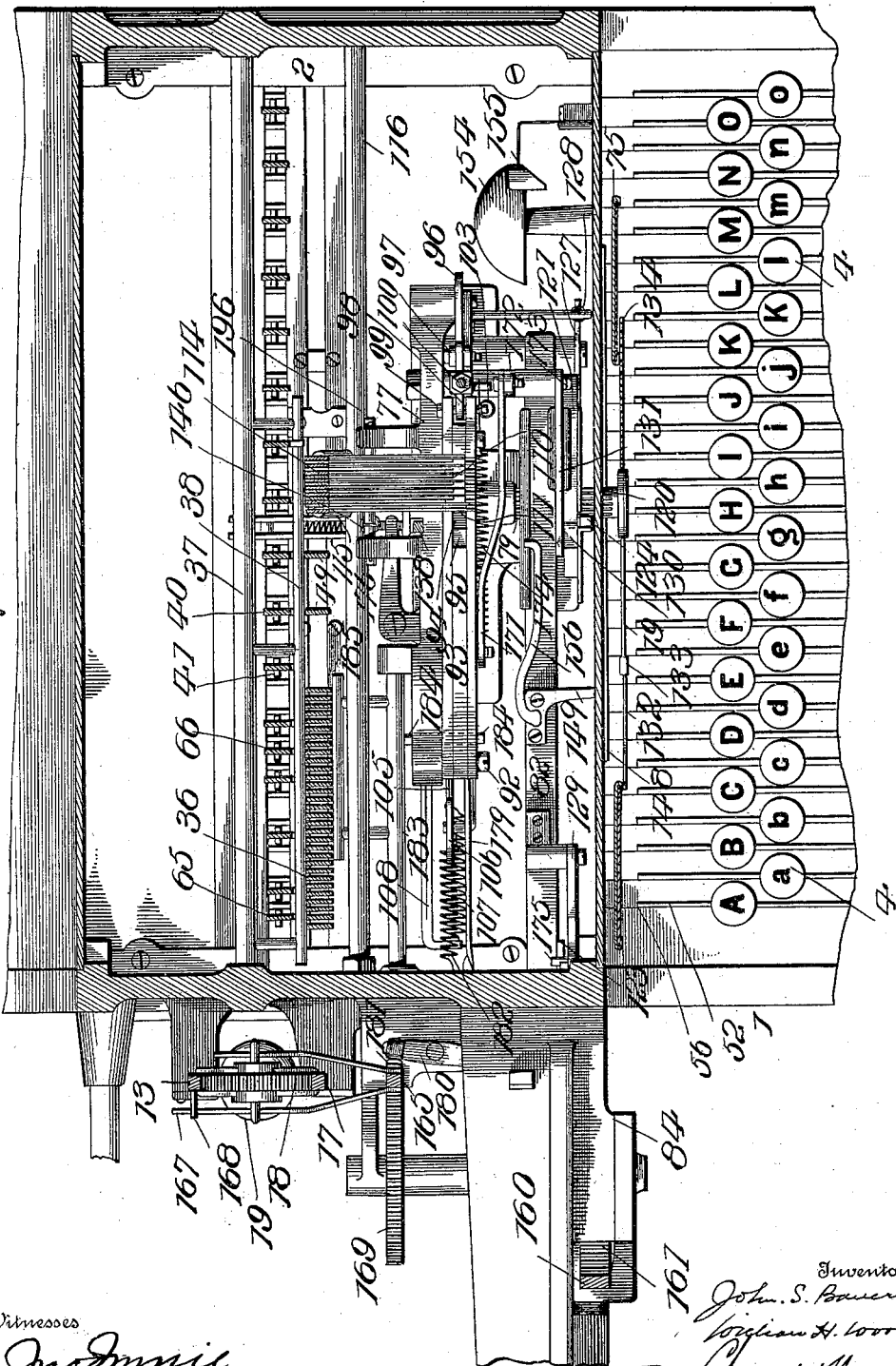

No. 628,620. Patented July 11, 1899.
J. S. BANCROFT & W. H. WOOD.
MACHINE FOR PERFORATING STRIPS FOR TYPE MACHINES.
(Application filed Mar. 21, 1899.)

(No Model.) 18 Sheets—Sheet 7.

Witnesses
Inventors:
John S. Bancroft
William H. Wood
By Their Attorneys

No. 628,620. Patented July 11, 1899.
J. S. BANCROFT & W. H. WOOD.
MACHINE FOR PERFORATING STRIPS FOR TYPE MACHINES.
(Application filed Mar. 21, 1899.)
(No Model.) 18 Sheets—Sheet 9.
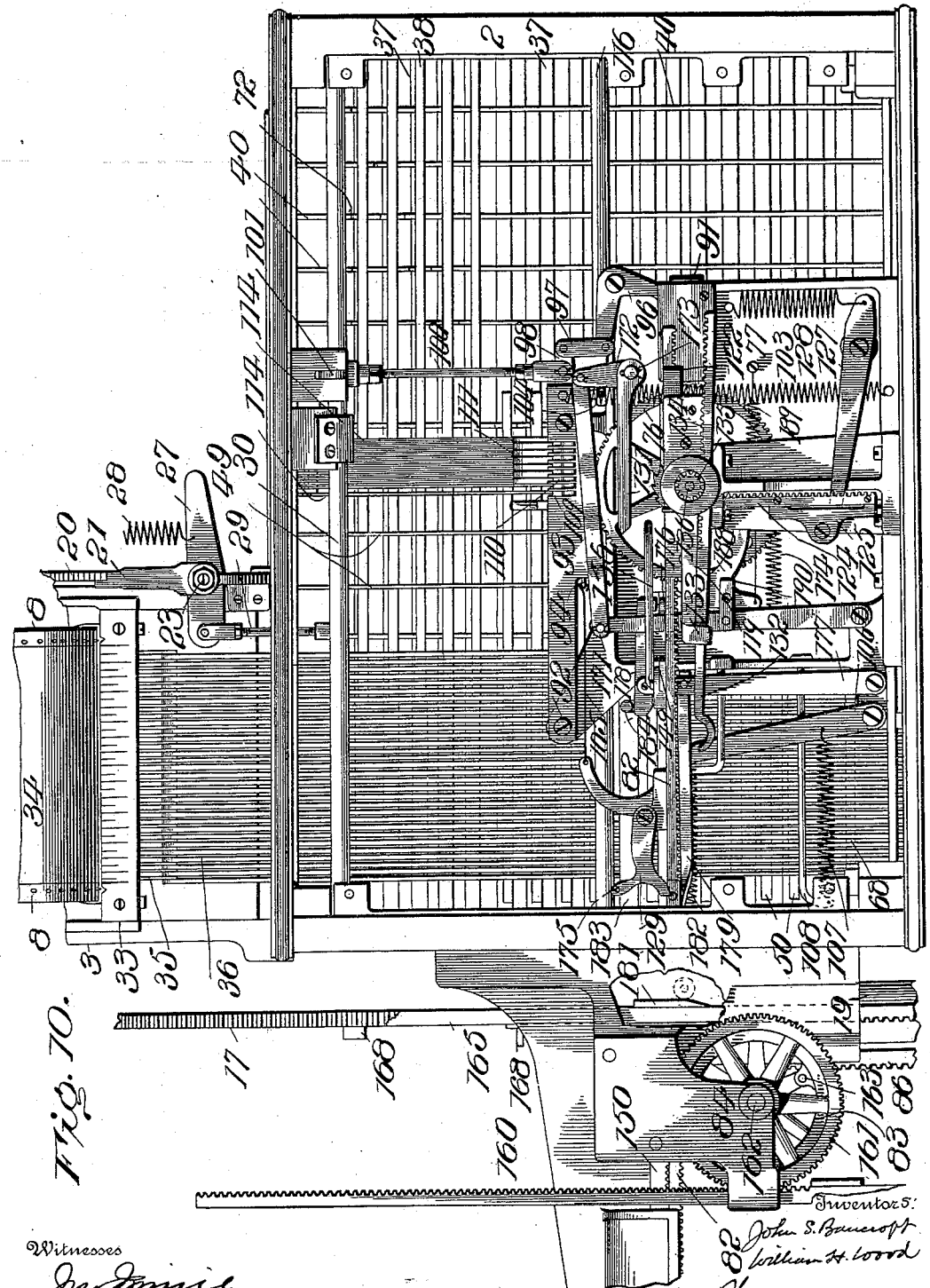

No. 628,620. Patented July 11, 1899.
J. S. BANCROFT & W. H. WOOD.
MACHINE FOR PERFORATING STRIPS FOR TYPE MACHINES.
(Application filed Mar. 21, 1899.)
(No Model.)   18 Sheets—Sheet 10.
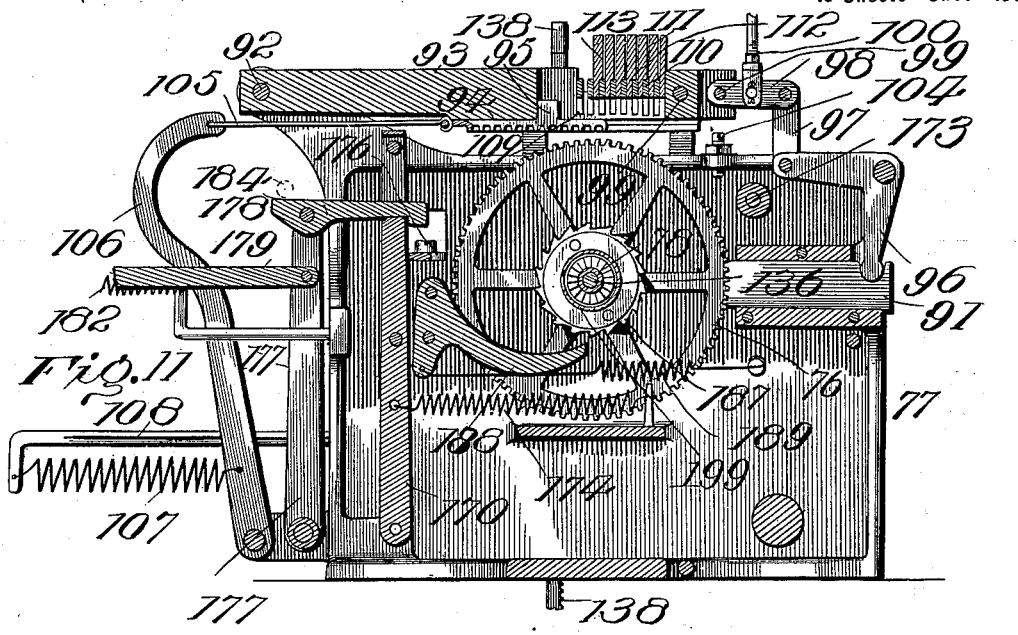
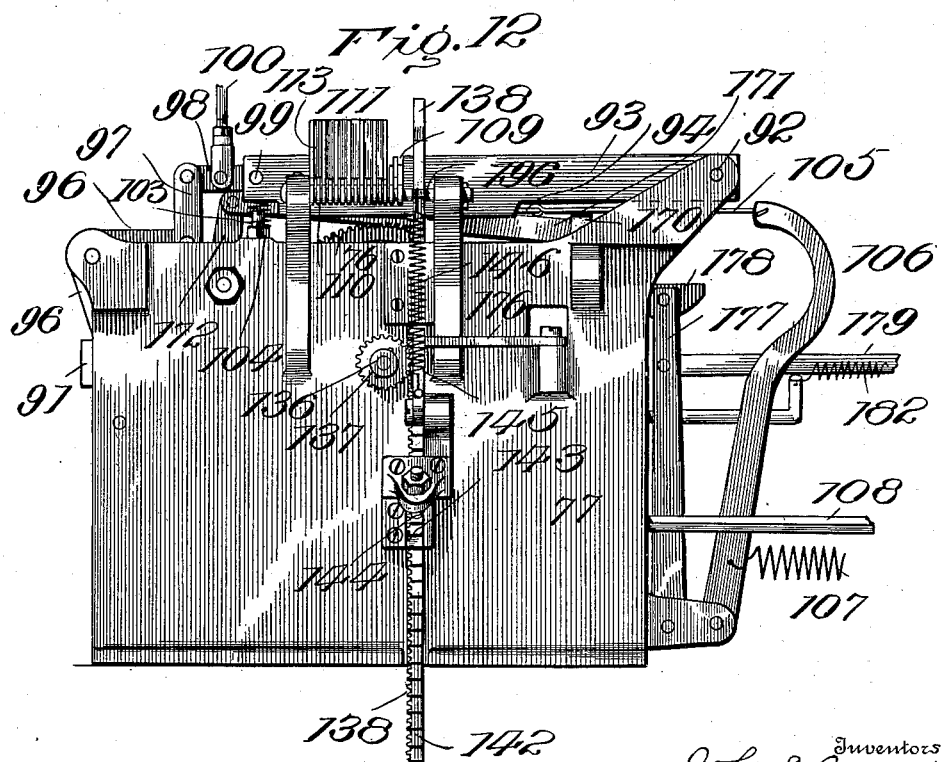
Witnesses
Inventors
John S. Bancroft
William H. Wood
By their Attorneys

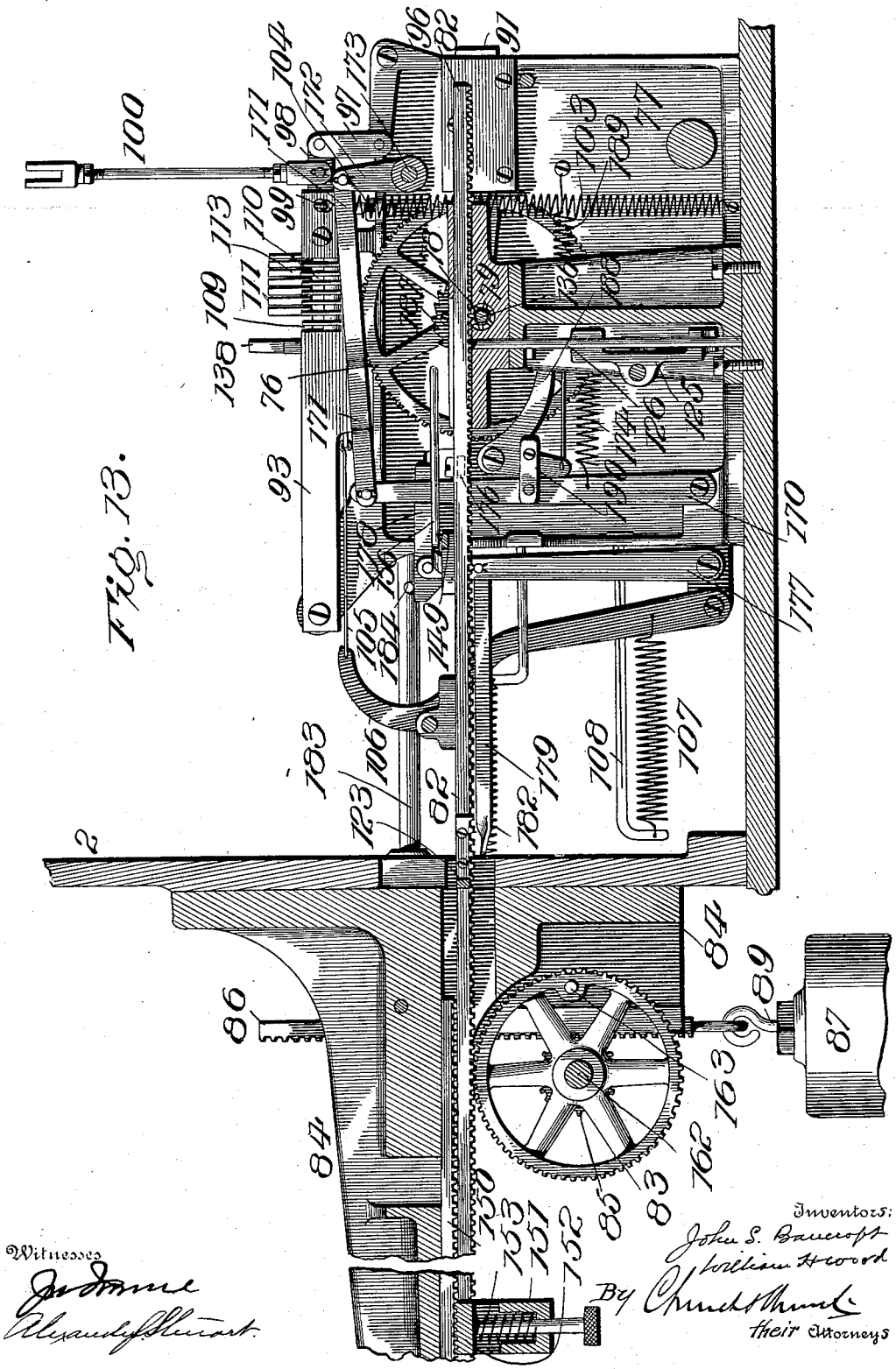

No. 628,620. Patented July 11, 1899.
J. S. BANCROFT & W. H. WOOD.
MACHINE FOR PERFORATING STRIPS FOR TYPE MACHINES.
(Application filed Mar. 21, 1899.)
(No Model.) 18 Sheets—Sheet 12.
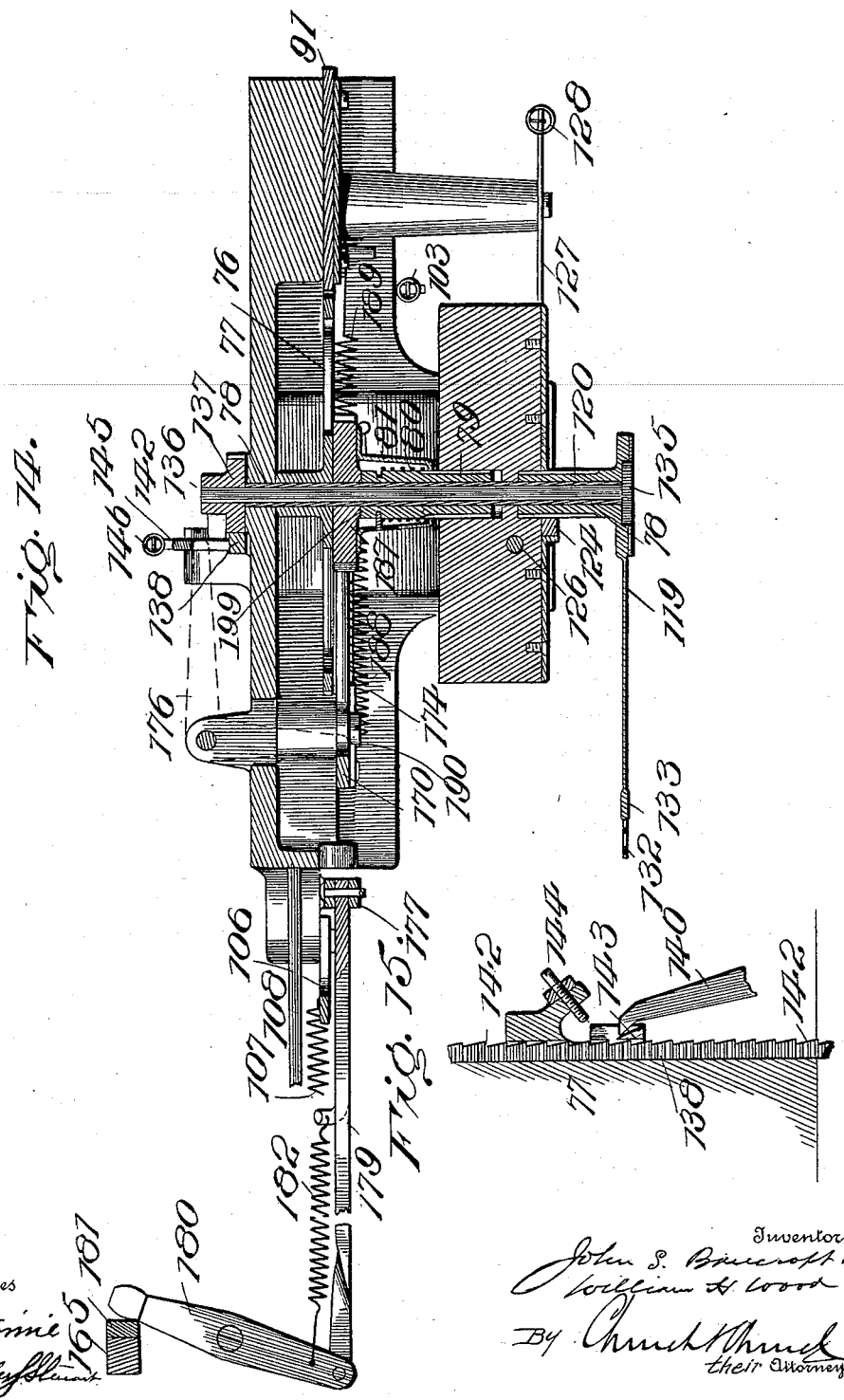

No. 628,620. Patented July 11, 1899.
J. S. BANCROFT & W. H. WOOD.
MACHINE FOR PERFORATING STRIPS FOR TYPE MACHINES.
(Application filed Mar. 21, 1899.)
(No Model.) 18 Sheets—Sheet 13.
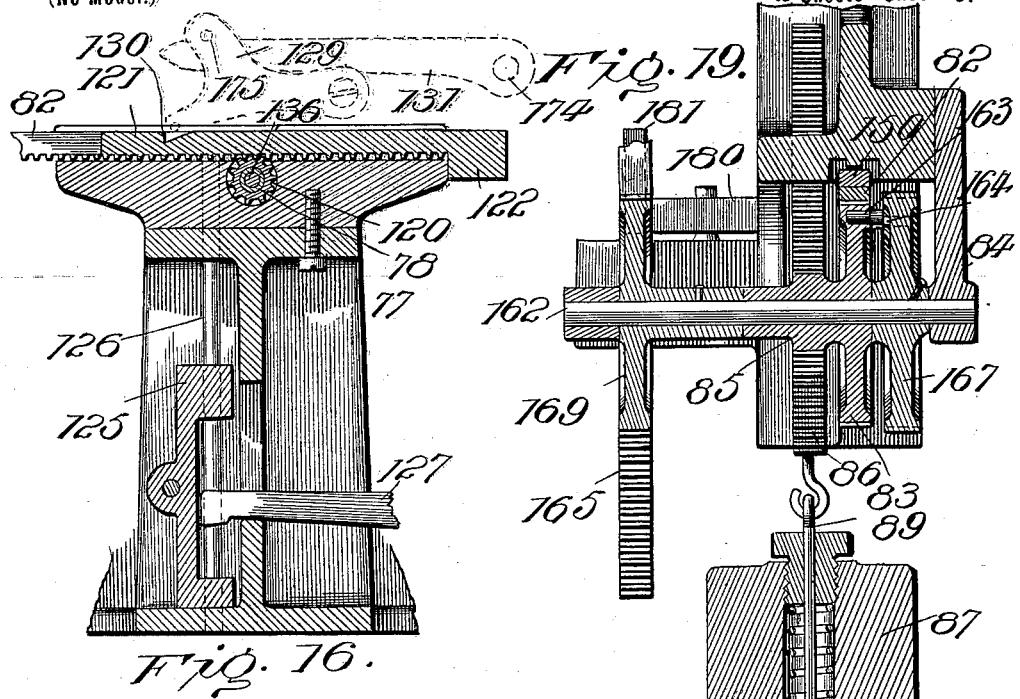
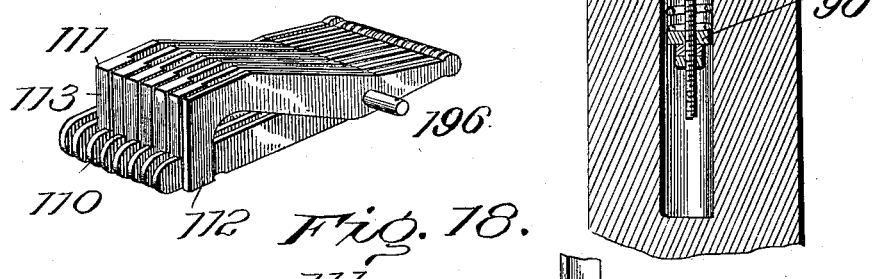

No. 628,620. Patented July 11, 1899.
J. S. BANCROFT & W. H. WOOD.
MACHINE FOR PERFORATING STRIPS FOR TYPE MACHINES.
(Application filed Mar. 21, 1899.)
(No Model.) 18 Sheets—Sheet 14.

No. 628,620. Patented July 11, 1899.
J. S. BANCROFT & W. H. WOOD.
MACHINE FOR PERFORATING STRIPS FOR TYPE MACHINES.
(Application filed Mar. 21, 1899.)
(No Model.) 18 Sheets—Sheet 15.

No. 628,620. Patented July 11, 1899.
J. S. BANCROFT & W. H. WOOD.
MACHINE FOR PERFORATING STRIPS FOR TYPE MACHINES.
(Application filed Mar. 21, 1899.)
(No Model.) 18 Sheets—Sheet 17.

No. 628,620. Patented July 11, 1899.
J. S. BANCROFT & W. H. WOOD.
MACHINE FOR PERFORATING STRIPS FOR TYPE MACHINES.
(Application filed Mar. 21, 1899.)
(No Model.) 18 Sheets—Sheet 18.
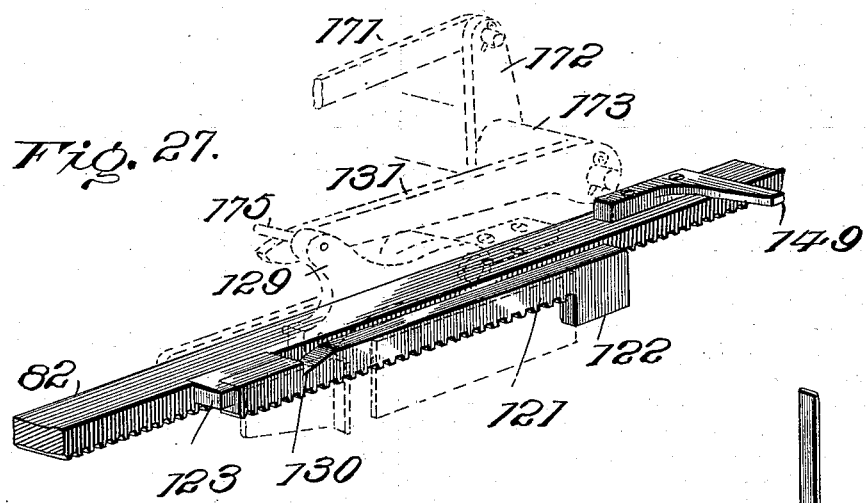
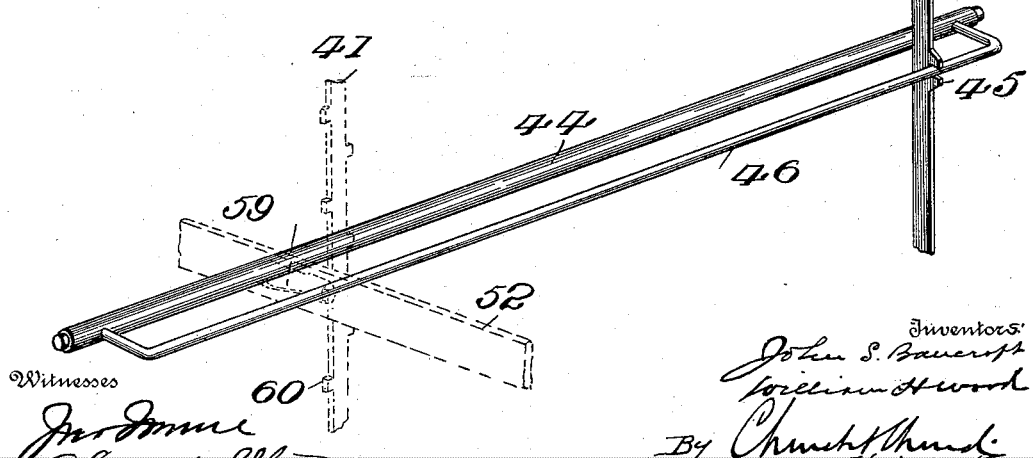

UNITED STATES PATENT OFFICE.

JOHN SELLERS BANCROFT AND WILLIAM HENRY WOOD, OF PHILADELPHIA, PENNSYLVANIA, ASSIGNORS TO THE LANSTON MONOTYPE MACHINE COMPANY, OF WASHINGTON, DISTRICT OF COLUMBIA.

MACHINE FOR PERFORATING STRIPS FOR TYPE-MACHINES.

SPECIFICATION forming part of Letters Patent No. 628,620, dated July 11, 1899.

Application filed March 21, 1899. Serial No. 709,908. (No model.)

*To all whom it may concern:*

Be it known that we, JOHN SELLERS BANCROFT and WILLIAM HENRY WOOD, citizens of the United States, and residents of Philadelphia, in the county of Philadelphia and State of Pennsylvania, have invented certain new and useful Improvements in Machines for Preparing the Perforated Record-Strips of Type-Forming Machines; and we do hereby declare the following to be a full, clear, and exact description of the same, reference being had to the accompanying drawings, forming a part of this specification, and to the figures of reference marked thereon.

This invention relates to improvements in apparatus or machines for preparing perforated record strips or ribbons such, for instance, as are designed, primarily, for controlling the production of printing characters or type through the medium of appropriate mechanism—that, for instance, employed in what is known as the "Lanston monotype system"—although features of the invention may be utilized in producing perforated record or control strips, ribbons, or the like for other purposes.

In United States Letters Patent No. 590,763, dated September 28, 1897, to Tolbert Lanston, a machine is set forth in detail for producing perforated record-strips of the character mentioned, and in its functions the machine contemplated by the present invention approximates closely that set forth in the said patent, to which reference may be had for a more clear understanding of the general objects to be accomplished, especially in respect to the relationship existing between the strip-producing mechanism and strip produced thereby and the subsequent functions performed by the strip in the character-producing mechanism. While the said points of similarity exist between the formerly-patented apparatus and the present invention, by the present improvement the mechanisms for accomplishing the desired ends are greatly simplified, the labor of the operator materially reduced, and generally more accurate and complete results are attained, particularly with respect to the justification-perforations, the machine indicating to the operator exactly which keys are to be struck to complete the justification of every line, thereby eliminating all mental calculation and liability of error and reducing the problem to a mechanical certainty.

Generally speaking, while the machine is an organized whole designed for accomplishing a unitary result embodied in the record or control strip, yet for the purposes of a detail description and a more ready understanding of the mechanical elements organized to produce such result the mechanism may be divided into groups, such groups comprising, first, the paper-feeding mechanism for advancing the strip or ribbon at regular intervals and holding it in position to receive the punches; second, the punching mechanism by means of which the perforations are made in the record-strip, said perforations being properly distributed and combined so as to represent and control the production of the separate types, points, spaces, &c., pertaining to the selected font, while certain other perforations control the setting of the justifying mechanism to vary the thickness of the bodies (preferably only certain selected bodies, as spaces and full-stop type) setwise and to inaugurate the movement of the galley mechanism at the completion of each line; third, the keyboard or finger mechanism, operating either mediately or immediately upon the mechanisms to control their movements; fourth, the justifying-indicator for indicating to the operator the appropriate justification-keys to be operated to make the indications for a properly-justified line; fifth, a line-indicator for indicating the number of units which can be included in a line or the number of units remaining unfilled in a line; sixth, the resetting mechanism for restoring the parts, particularly the indicating mechanism, to the zero-point, ready for subsequent operations.

With this preliminary explanation the details of the several mechanisms and their correlation will now be described, the particular features of novelty of the invention being set forth in the appended claims.

Figure 8:
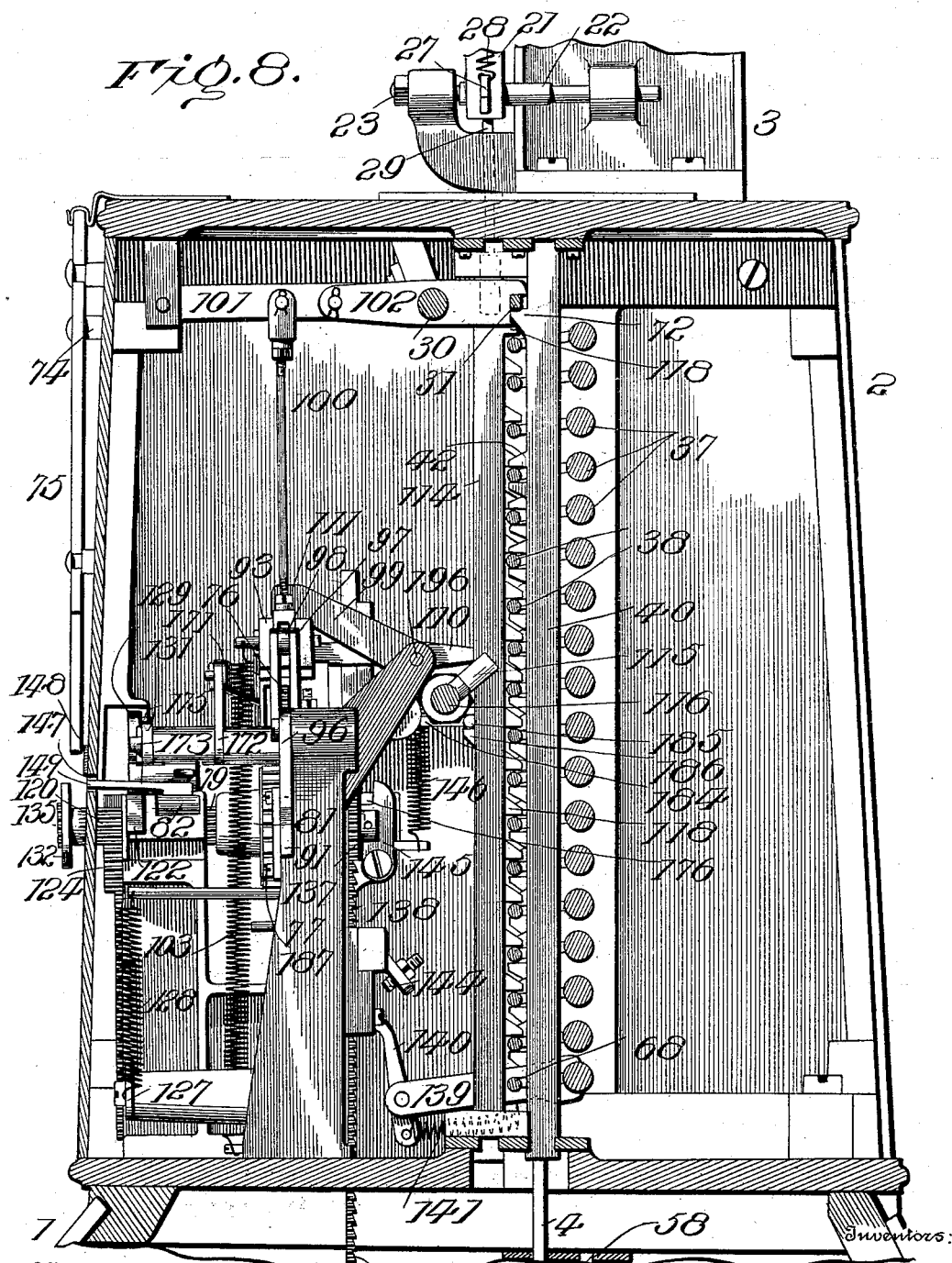
Figure 9:
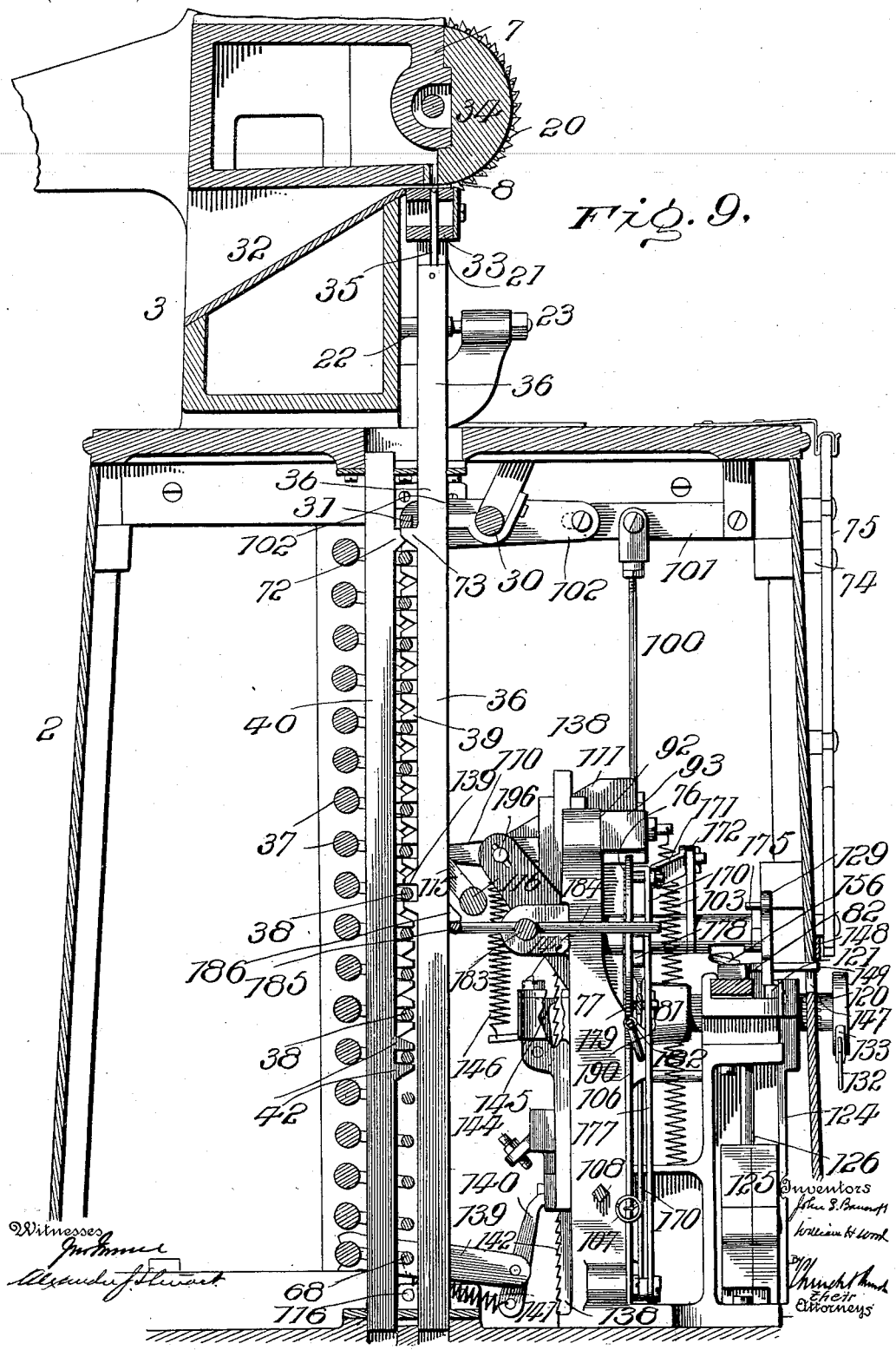
Figure 20:
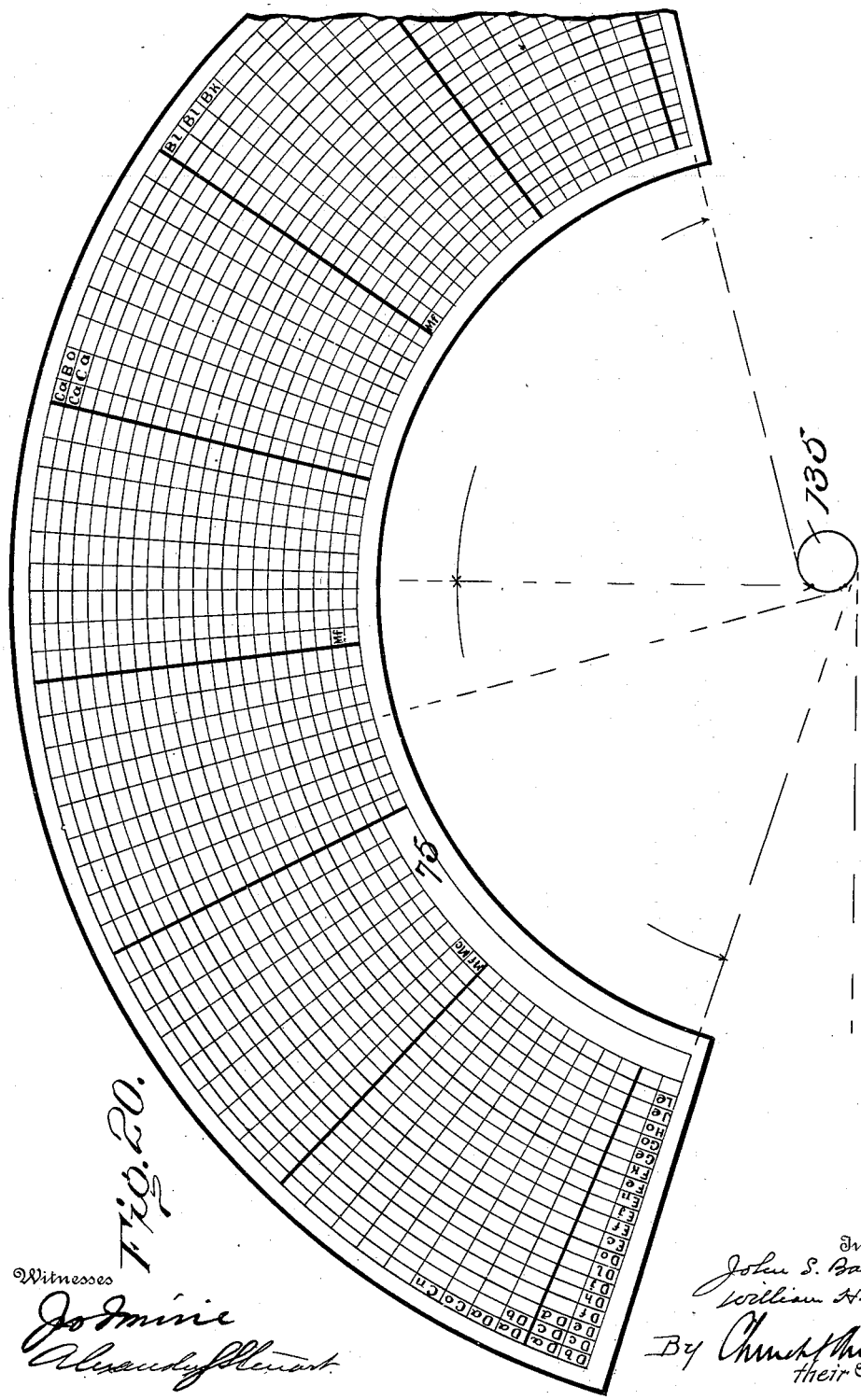
Figure 21:
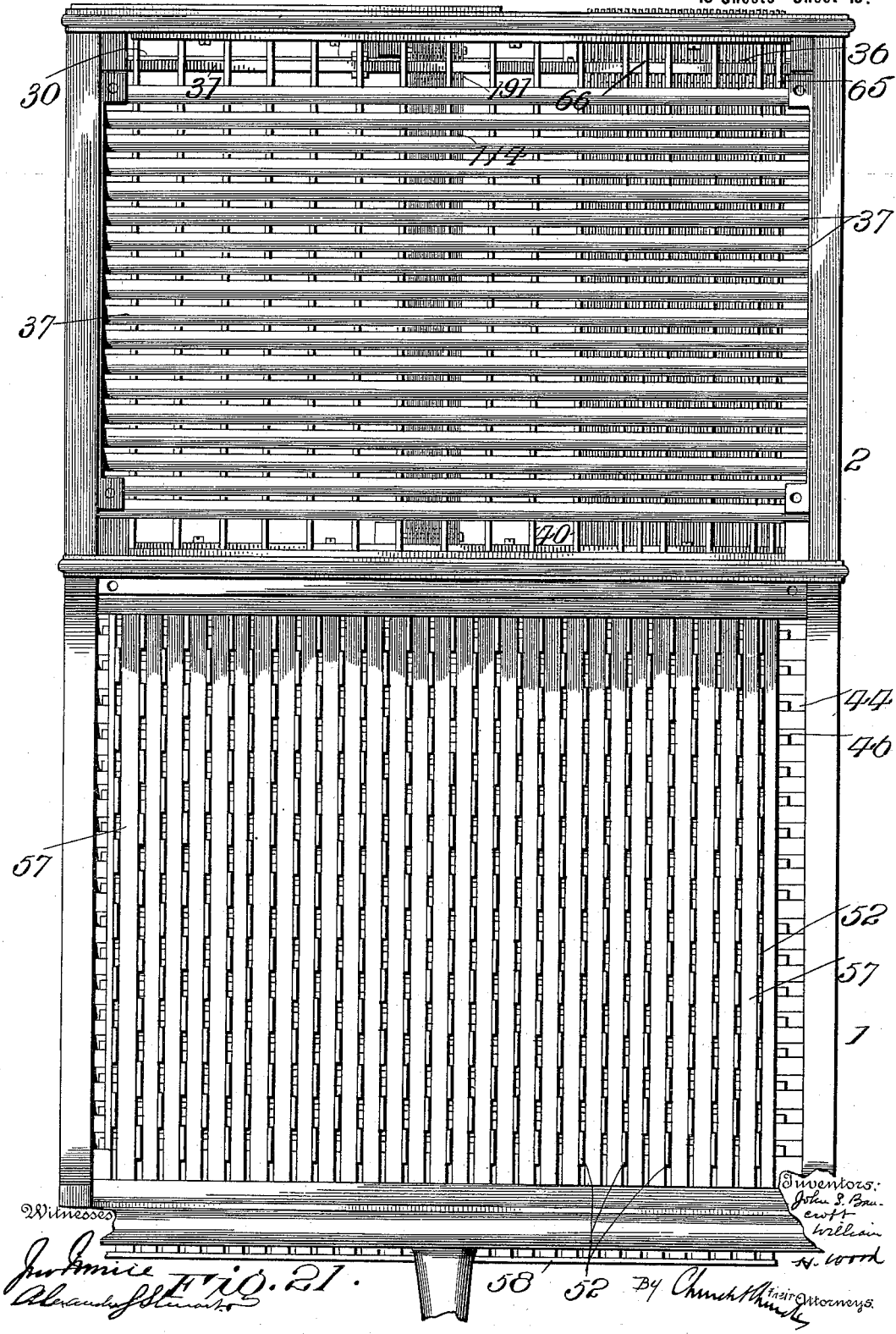
Figure 22:
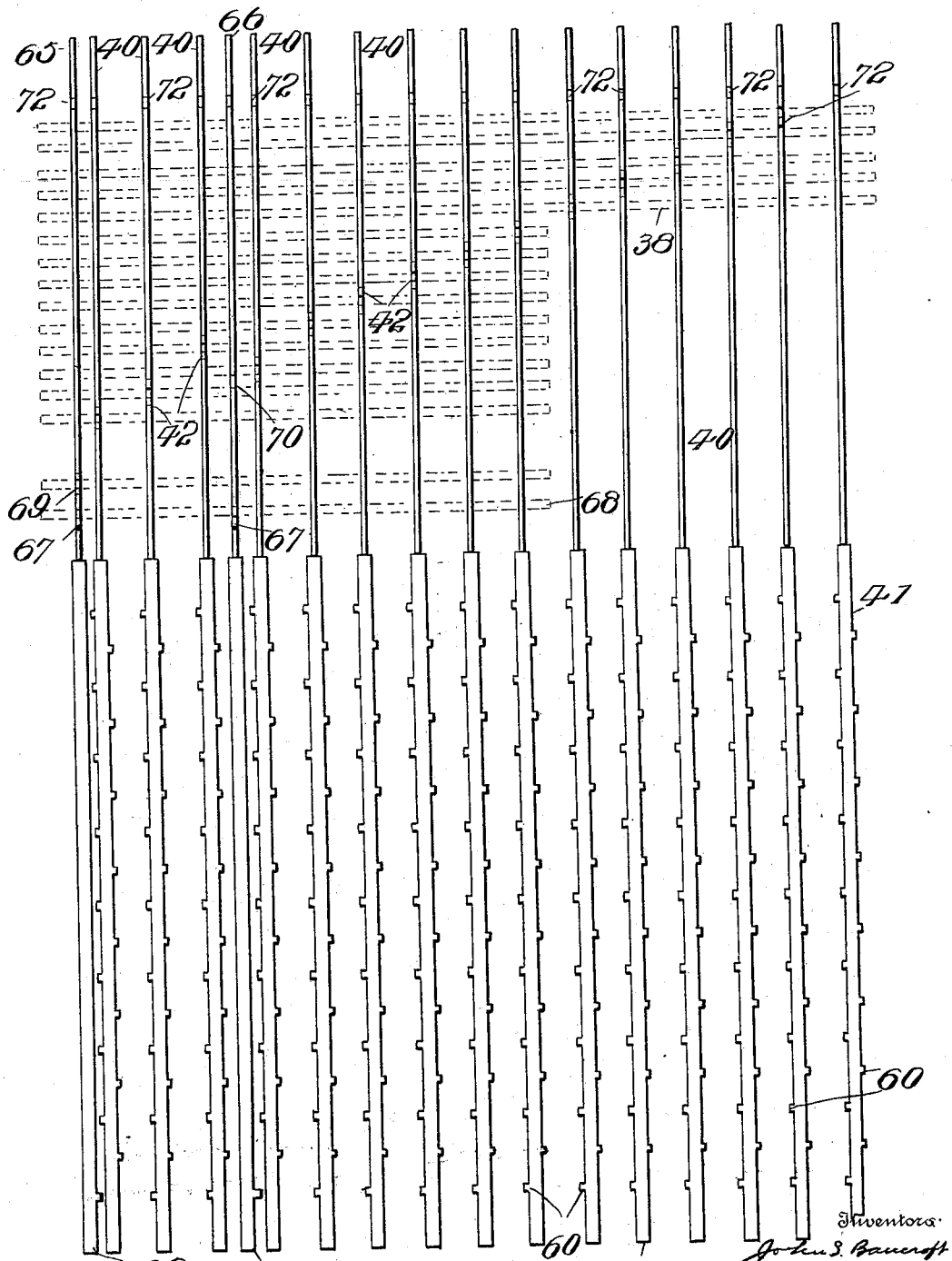

In the accompanying drawings, Figure 1 is a perspective view of a keyboard record-producing mechanism embodying the present improvements, and Fig. 2 is a front elevation of the same, these two figures showing the parts in their zero position. Fig. 3 is an elevation looking at the left-hand side of the machine, with the parts in the position indicated in Figs. 1 and 2. Fig. 4 is a vertical section taken centrally through the upper portion of the machine and looking toward the left-hand side, the paper-feeding mechanism being shown in elevation. Fig. 5 is a detail sectional view of the rigid and limber pawls of the paper-feeding mechanism. Fig. 6 is an elevation with the side casing removed looking toward the left-hand side, this figure showing the lower portion of the machine, while Fig. 4 shows the upper portion on substantially the same scale. Fig. 7 is a horizontal section taken above the indicator-operating mechanism and showing the main portion of such mechanism in top plan. Fig. 8 is a vertical section taken through the upper portion of the machine, looking toward the left and showing the indicator mechanism in side elevation. Fig. 9 is a corresponding view taken to the left of the indicating mechanism looking toward the right and showing such mechanism in elevation from the side opposite that illustrated in Fig. 8. Fig. 10 is a front elevation of the upper portion of the machine with the front of the casing and justification-indicators removed. Fig. 11 is a vertical section taken transversely of the units-wheel shaft to show the units-wheel-controlling mechanism. Fig. 12 is a view looking at the opposite side of the mechanism illustrated in Fig. 11 and showing the rack and pinion for advancing the justification-indicator upon the operation of certain predetermined keys, (space-keys, for instance.) Fig. 13 is a vertical section of the units-wheel and indicator-controlling mechanism, taken in a plane just in front of the units-wheel rack and showing the upper end of the driving-weight and its rack for imparting motion to the units-wheel rack, units-wheel, and line-indicator. Fig. 14 is a detail horizontal section looking downwardly and taken on a plane coincident with the axis of the units-wheel and justification-indicator shaft. Fig. 15 is a detail sectional elevation showing the operating mechanism for advancing the justification-indicator in accordance with the number of justifying type-bodies included in any particular line. Fig. 16 is a sectional view taken transversely of the indicator-shaft in a plane intersecting the indicator rack and pinion. Fig. 17 is a detail perspective view showing the assembled group of units-wheel stops for limiting the movement of said units-wheel in accordance with the number of units contained in the bodies of the particular type designated in the operation of the key-levers. Fig. 18 is a detail perspective view of one of said stops, showing a section of one of the stop-operating bars. Fig. 19 is a vertical section through the power-weight and the gearing for transmitting the power to the several mechanisms. Fig. 20 is a diagrammatic view illustrating the justification chart and indicator. Fig. 21 is a rear elevation of the whole machine with the rear plates of the casing removed to show the upper rock-bars, the ends of the lower rock-bars, the rear ends of the key-levers, and the guide-bars for positioning the key-levers. Fig. 22 is a diagrammatic view illustrating the upper and lower units-bars with the lugs on the latter with which the key-levers coöperate, this view also showing in dotted lines the upper series of rock-bars for operating the units system of punches and the stop-bars. Fig. 23 is a similar view showing the stop-bars, the punch-bars, the lower punch-bars, and in dotted lines the rock-shafts shown in Fig. 22 and, in addition, in dotted lines the rock-shaft for communicating motion from the key-levers to the lower punch-bars. Fig. 24 is a side elevation of one of the upper punch-bars. Fig. 25 is a side elevation of one of the stop-bars. Fig. 26 is a side elevation of one of the lower stop-bars. Fig. 27 is a detail perspective view showing the main and supplemental racks for operating the units-wheel and justification-indicator arm, together with the locking-pawl for uniting said racks and the throw-out arm for said pawl, said arm and pawl being shown in dotted lines. Fig. 28 is a perspective view showing one of the lower rock-bars and the means for imparting motion therefrom to the lower punch-bars, a key-lever and lower units-bar being shown in dotted lines.

The working mechanism of the machine, which latter will be termed a "keyboard," may be conveniently mounted in a frame or casing which is preferably divided into a bottom section 1 and intermediate section 2 and a paper-supporting frame 3, surmounting the section 2. The bottom section 1 of the casing preferably has an extended base for the accommodation of the key-levers and at its front is arranged to permit the key-levers to project for the attachment of the finger-pieces 4, these finger-pieces and key-levers being arranged in vertical columns and horizontal rows, as will hereinafter appear in the description of this particular part of the machine. The intermediate portion of the casing 2 preferably contains the indicating mechanism and a portion of the punch-bar-operating mechanism, and at the left-hand side provision is made for supporting the weight from which the driving power is secured and the racks and mechanism through which such power is transmitted to the operating parts of the keyboard.

For convenience in manufacture both in respect to the assembling of the parts and in respect to the cost the three sections of the casing and the mechanism carried thereby are made up of independent parts, which, however, in the assembled structure are connected up for unitary action.

*Mechanism for holding and feeding the paper.*—The frame 3 at the top of the machine is arranged with bearings 5 for the reception of the journals of the spools upon which the paper or record strip is wound, this strip being preferably in long lengths previously prepared with marginal perforations and wound upon a spool or bobbin adapted to be held in place in the bearings 5 by a shaft or pin 6, upon which the spool may be placed and from which it may be drawn around a hollow die 7 by means of pin-wheels 8, arranged to engage the marginal perforations in the strip and from which it is carried to and wound upon the receiving roller or spool 9, journaled on a removable shaft 10, said spool being adapted to be rotated to maintain the tension on the paper regardless of the particular size of the roll, as will be now described.

The receiving-roll 9 at one end contacts or is removably connected with a short shaft 11, carrying at its outer end a pinion 12, meshing with a vertical rack 13, the connection between the shaft 11 and the pinion 12 being made by means of a spring-pressed clutch-section 14, whereby the rack may be raised without reversing the rotation of the roll and tend by its weight and the driving-weight to be presently referred to to rotate the roll forwardly for winding the paper. The pin-wheels 8 are mounted on a corresponding shaft, having a pinion 15 connected therewith through a clutch-section 16, Fig. 2, and adapted to be driven by means of a vertical rack 17. The two racks 13 and 17, Figs. 1 and 3, are arranged to work vertically in parallelism in suitable guides on the side of the frame or casing, and between them is suspended a pinion or gear-wheel 18, from the journal of which a weight 19 is suspended and hence tends to draw said racks downwardly for advancing the paper, but permits the said racks to move independently in order to allow for the variation in the size of the receiving-roll and at the same time maintain a proper and constant pressure on both the pin-wheels and receiving-roll for advancing the paper across the die 7, where it is in position to be acted upon by the punches for producing the perforations therein which constitute the record.

To check the feed of the paper and hold it stationary during the time the punches are acting thereon, the pin-wheel shaft is provided at the end opposite the pinion 15 with an escapement-wheel 20, with which an escapement formed by stiff and limber pawls is adapted to coöperate for permitting the feed of the paper one tooth at a time upon the operation of any one of the key-levers and for holding the paper stationary at all other times.

By reference particularly to Figs. 4 and 5 it will be seen that the escapement-wheel 20 is preferably an ordinary ratchet-wheel and the pawls are mounted upon the frame 3, so as to vibrate transversely of the wheel, the stiff pawl 21 being rigidly mounted upon an oscillatory shaft 22, held in bearings on the frame 3 and adapted to abut against a single adjustable stop 23, readily accessible from the front of the machine for adjusting the position of the rigid pawl with respect to the escapement-wheel, and at the same time by throwing said pawl out of engagement with the escapement-wheel its shaft may be moved backwardly in its bearings or the paper advanced or retracted, as desired, without interference by the pawls. The limber pawl 24 is pivoted upon the stiff pawl 21 and is drawn backwardly against a stop 25 on the stiff pawl by means of a spring 26, the extent of independent movement of this limber pawl being equal to the distance between two adjacent teeth on the escapement-wheel, and thus when the stiff pawl is vibrated transversely of the wheel the pawls will be drawn alternately into engagement therewith and the wheel permitted to advance one tooth at a time in the ordinary way.

The pawl-shaft 22 is provided with a transversely-arranged arm 27, to one end of which the returning spring 28, Figs. 1, 4, and 10, is attached and to the opposite end of which a link 29 extends down through the top of the casing and is attached to an arm projecting from a shaft 30, which shaft will be herein designated the "feed-shaft" and is shown clearly in Figs. 4, 9, 10, and 22. This feed-shaft 30 is provided with a bail 31, by means of which it is operated and is designed not only to operate the paper or record strip feed, but also to operate the feed mechanism of the units-wheel and justification-arm, as will hereinafter appear.

*The punching mechanism.*—The die 7 is made hollow for the reception of the punchings, and beneath the die 7 the frame 3 forms a guide 32, Fig. 9, for directing the entry of the paper through between the punch-guides 33 and the die 7, from which point the paper passes around the front 34 of the die, which is preferably curved to conform to the contour of the pin-wheels, so as to maintain the paper in its correct alinement without wrinkling it. The punches themselves, 35, (thirty-one in number,) are arranged in a line and preferably in a plane radial to the axis of the pin-wheels. They pass through the guides 33, whereby their position is maintained. For convenience and efficiency their upper ends or operative faces may be notched, as shown in Fig. 9, to secure a cleaner cut and easier entry or passage of the punches through the paper. At their lower ends they are each connected to the upper ends of a corresponding series of vertically-arranged punch-bars 36, preferably extending down to the bottom of the intermediate section 2 of the casing and held in suitable guides therein, so as to be capable of a limited longitudinal movement, but be held against transverse movement in any direction. The whole body of punches is arranged in a line having a length somewhat less than the width of the record strip or paper within the marginal perforations, as will be seen from an inspection of Figs. 1, 2, and 10. In their several combinations they are designed to represent by their perforations all of the characters on the finger-pieces of the keyboard, including the spaces and the justification-indications for varying the body thickness of the particular characters selected for justification, such as the space and full-stop characters, for instance. Bearing in mind the fact that the strip itself is designed to control in the casting-machine the positioning of the die-case for forming the characters in two different directions, so as to center any character to be formed thereby, and, further, that it is convenient both for the purposes of producing the record-strip and for the production of the characters themselves to arrange the characters in the die-case in columns, the characters in each column being of the same body thickness setwise and in lines at right angles to said columns, the body thickness of the characters in the lines varying according to the particular column in which they are located, it will be seen that it will be convenient to similarly arrange the punches and the key-levers—that is to say, the finger-pieces of the key-levers may be grouped to correspond to the columns and lines of the die-case in the character producing or casting machine—and in order to produce the proper combinations of punches those punches producing representations of characters in the columns will be operated through a different train of connection from those representing the characters in the lines, and hence when any one finger-piece is depressed these two mechanisms will be operated thereby, so as to move a punch for indicating the proper column and also a second punch for indicating the proper character in that column. In this description, therefore, those punches for selecting the desired column of characters will be designated as the "units-punches," this designation being appropriate because of the fact that these punches make perforations for selecting the column having characters of the desired number of units of width or body thickness therein, and the punches for selecting the characters in those columns will be designated as the "character-punches," a corresponding distinction being followed with respect to the operating mechanism for the said punches.

Extending across the machine and journaled in the sides of the intermediate section 2 and in rear of the punch-bars is a vertical series of units-punch-operating rock-shafts 37, the number of rock-shafts being one in excess of the number of punch-bars to be operated thereby, inasmuch as two of the said rock-shafts are adapted to operate upon the same punch-bar, as will be hereinafter referred to. These units-punch-operating rock-shafts are each provided with a forwardly-extending bail 38, adapted to coöperate with lugs or projections 39 on the rear edges of the punch-bars, as will be readily understood from an inspection of Figs. 6, 9, and 23, the latter figure particularly showing, diagrammatically, which punch-bar in this particular machine is adapted to be operated by each of the rock-shafts. For operating the rock-shafts and their bails there is provided a series of units-bars corresponding in number to the number of columns in the keyboard, which in the present instance is fifteen, and these units-bars for convenience are divided into upper and lower units-bars, the upper units-bars being numbered 40, Figs. 4, 9, and 22. The bars 40 are guided to work vertically in the intermediate section 2 of the casing, being spaced transversely to correspond, approximately, to the column arrangement of the keyboard and are each provided with a forwardly-projecting lug or lugs 42, embracing or engaging the bail on the appropriate rock-shaft and so raise and lower the appropriate punch-bar and punch. From an inspection of Figs. 10 and 22 it will be seen that it is not necessary that all of the bails on the rock-shafts shall extend entirely across the casing, inasmuch as the lower rock-shafts are operated by the units-bars on the left-hand side of the machine only, and hence for convenience in manufacture these bails are somewhat shorter than the bails on the upper units-bar rock-shafts. The upper units-bars 40 at their lower ends rest upon and are adapted to be raised by lower units-bars 41, Fig. 22, the planes of the two bars being at right angles to each other to secure a sufficient bearing and at the same time to facilitate the construction and assembling of the parts. The said lower units-bars extend down through the columns of key-levers and are adapted to be operated thereby, as will be presently explained, in connection with the keyboard or finger mechanism.

The character-selecting punch-bars rest at their lower ends upon the upper ends of the lower sections 43 of the character-selecting punch-bars, the latter sections being held in guides in the bottom section 1 of the casing, so as to work vertically, and are adapted to be operated—i. e., raised and lowered—by means of lower rock-shafts 44, journaled in the bottom section 1 of the casing and extending transversely of the key-levers. For this purpose the said punch-bar sections are provided at the proper points (indicated in Fig. 23) with lugs or projections 45, which engage or embrace bails 46 on the rock-shafts 44, as shown clearly in the detail perspective view Fig. 28, and the rock-shafts are operated by the key-levers, as will be presently described in connection with the keyboard mechanism. These lower sections of the character-selecting punches being grouped together at the left-hand side of the machine would occupy practically all of the space and leave no room for the vertical columns of key-levers at this point, and in order to provide space for these columns of key-levers some of the lower sections of the punch-bars may be omitted, leaving spaces 47, Fig. 23, and in order to transmit the movement of the appropriate rock-bars to the punch-bars above such spaces suitable lower sections, such as 48, may be provided at any other convenient point, and the said sections 48 at their upper ends engage corresponding upper sections 49, which in turn coöperate with upper rock-bars 50, and the latter engage those punch-bars (the lower sections of which are omitted, as before described) to raise and lower the same and thereby produce the desired perforations. As shown in this Fig. 23, it will be seen that the third and sixth lower sections are omitted and the third and sixth lower rock-bars, which would normally coöperate with such sections, now coöperate with the added lower sections 48, and the third and sixth punch-bars coöperate with the third and fourth upper rock-bars, which derive their motion from the added upper sections 49. The tenth punch-bar is a constant punch-bar for those characters, "space and full-stop characters," the bodies of which are varied for justification, and this punch-bar is operated by the lowermost of the upper series of rock-bars and is adapted to be operated by the units-bars moved by the key-levers corresponding to those characters, as will be presently explained. The spaces thus provided in the series of lower sections of the punch-bars will accommodate three vertical rows or columns of key-levers, and in connection with the fourth vertical row or column of key-levers a different method of providing the space is shown. Referring again to this Fig. 23, it will be seen that the lower punch-bar section corresponding to the thirteenth punch, counting from the right-hand side in this figure, (left-hand side of the machine,) is simply deflected to one side or bent at the top and bottom, so as to leave the vertical space 51, in which the key-levers may work.

The seventeenth punch-bar, Fig. 23, counting from the right-hand side of this figure, (left-hand side of the machine,) it will be observed is provided with two projections 39, adapting this punch-bar to be operated by the second and fifth upper rock-bars, counting from the bottom. This is done in order to economize the number of punches, as it is found that the punch which is operated by the units-bar corresponding to the left-hand column of character-keys may be also utilized as one of the punches in the space combination. Thus the space-key operating the units-bar 65 will operate the tenth and seventeenth punch-bars, counting from the right-hand side of Fig. 23, and the seventeenth punch-bar will also be operated in proper combination by any one of the vertical columns of keys at the left-hand side of the keyboard and representing characters having a body thickness less than any of the other characters except the space.

*Keyboard or finger mechanism.*—In the base-section 1 of the casing there is arranged a series of key-levers 52, corresponding in number to the number of finger-pieces 4 and the number of characters, including justification-keys, space-keys, and quad, designed to be represented by the several combinations of punches and to be reproduced by the casting or type-forming machine. These key-levers (see Figs. 6 and 21) are preferably flat bars or punchings pivoted at substantially the center on shafts 53, running through from side to side of the casing, the pivotal point being at about the center of gravity of the levers, whereby the levers will be substantially balanced, and the series of pivots is arranged on a diagonal line, so as to give as near as practical a uniform angular movement to the rock-shafts operated thereby.

The movement of the key-levers is limited by the slots 56 in the front plate of the lower section of the casing, and at their rear ends they are spaced and held in the proper vertical plane by guide-bars 57, suitably mounted in the casing and held in place by cross-bars 58 at the top and bottom.

To economize space and at the same time permit the use of relatively thin wide key-levers which will be rigid enough to perform the work imposed upon them, the vertical columns of key-levers corresponding to or for producing indications of characters having uniform widths are staggered—that is to say, the key-levers in the top horizontal row will be located on the opposite sides of the guide-bars 57 from the key-levers in the second horizontal row; but starting from the right-hand side of the keyboard, for instance, the key-levers located on both sides of the first guide-bar 57 will correspond to and be adapted to operate a punch for indicating a uniform body width, and this result is secured by adapting all of said key-levers in this vertical column to coöperate with a single one of the lower units-bars; but each of said key-levers except the lowermost will coöperate with and operate a different lower rock-bar. Thus each of said key-levers will select or produce an indication for a different character in that column.

It will be seen that the key-levers are each provided with a transverse aperture 59, elongated lengthwise of the key-levers, and through which aperture the lower rock-shafts 44 and their bails 46 work, the bails 46, however, resting at the bottom of the rear portions of the apertures 59, whereby when any one of the key-levers is depressed at the forward end and raised at the rear end the bails will be moved upwardly and the rock-shafts oscillated to a corresponding degree. The lower units-bars 41 also extend down between the key-levers, one of said units-bars being arranged between the staggered key-levers of each column, and upon opposite sides of these lower units-bars are formed a series of projections or lugs 60, corresponding in number and position to the key-levers with which the units-bars coöperate. The lugs are arranged on opposite sides of the lower units-bar to correspond with the staggered arrangement of the key-levers and are adapted to be located within the openings 59 in the key-levers, preferably in rear of the bails 46. This arrangement, it will be observed, permits the key-levers to have a considerable width vertically, and at the same time the vertical height of the entire column or series may be very much reduced by overlapping the tops and bottoms of the key-levers, and, in fact, only sufficient space need be left for the operation of the rock-shafts and the lower units-bars. Thus the size of the keyboard may be reduced or a larger number of characters included in a keyboard of given size.

As before intimated, the character producing or casting machine for which the representations or character indications in the record-strip are produced in the present machine contemplates the use of a die-carrier having movements back and forth at right angles to each other, such combined movements being adapted to bring any particular character to the centering or casting point, and the extreme advance movement in each direction of this die-carrier is determined by a fixed stop. Hence in the record producing or punching machine it is unnecessary to provide indications for these two positions of adjustment—that is to say, assuming that the characters along one edge of the die carrier or block are all of a given width or in one column it is only necessary to employ a perforation or indication for selecting the proper character in that column, and, on the other hand, if the movement is in the other direction the particular line is determined by the fixed stop against which the die-carrier is arrested, and it is only necessary to provide a perforation for the particular column in which the desired character is located. Because of this arrangement it is not necessary to provide a punch-operating units-bar for the right-hand column on the keyboard, although from Fig. 22 it will be seen that such a bar, both an upper and a lower section, is provided, not, however, for operating a punch, but only for feeding the paper and justification or indicating mechanism, as will be presently explained. Neither is it necessary to provide a rock-shaft and bail for the bottom row or line of key-levers, and consequently the rock-shaft is omitted entirely from this place, as shown clearly in Fig. 6. The lower units-bars, however, are operated by the lower line of key-levers for selecting the particular column in which the characters are located, and each of the key-levers of the right-hand column operates its appropriate rock-bar for indicating its particular character in that column. The operation of the lower right-hand key at the junction of the lower line and right-hand vertical column will cause an extreme throw of the die-carrier in both directions, and in the present structure this character is a quad and is given a determinate body width.

The space-key 61 and the leader full-stop or period key 62 in the present machine are arranged in the bottom row or line, and inasmuch as in the practical application of the present invention it is designed to have these keys produce indications which will in turn enable the justification of the line to be secured by the variation in the body widths of these type and no others special connections between the key-levers and the punches are provided for said keys. Mechanically the connections are similar to those already described, and the particular arrangement of the mechanical parts will be best understood from an inspection of Figs. 22 and 23.

Referring to Fig. 22, 63 indicates a bar corresponding to the lower units-bars, but adapted to be operated solely by the space-key 61, and 64 is a corresponding bar adapted to be operated solely by the leader full-stop or period key 62. These two bars 63 and 64 at their upper ends contact with and are adapted to operate space and period units-bars 65 and 66. Both these bars 65 and 66 have lugs 67 thereon, adapted to coöperate with the lowermost of the upper rock-bars or its bail, (numbered 68 for convenience in distinguishing it.) In addition the space-bar 65 has a lug 69, adapted to coöperate with the next to the lower one of the upper rock-bars, and through these two rock-bars the space-key will elevate the tenth and seventeenth punch-bars, counting from the right-hand side, Fig. 23, (left-hand side of the machine.) The upper full-stop or period bar 66 also has a second lug or projection 70, which coöperates with the seventh rock-bar from the bottom of the upper series of rock-bars, and this rock-bar in turn will raise the twentieth punch-bar, counting from the right-hand side of Fig. 23. In addition the tenth punch-bar is raised, as just explained, making perforations which indicate and will control the production of justifying type-bodies in the line when the casting or producing mechanism has been properly set by the desired justification-perforations.

The justification-perforations are formed by a combination of punches controlled from the two uppermost rows or lines of key-levers, and in so far as the operation of the punches by these key-levers is concerned it does not differ mechanically from the operation of the other punches. Referring again to Figs. 22 and 23, it will be seen that the upper line or row of key-levers will each operate its appropriate units-punch through the units-bars and upper rock-shafts, and in addition this upper row will from the topmost of the upper rock-shafts operate the thirteenth punch, counting from the left-hand side, Fig. 23, while the key-levers in the second row or line will each operate its proper units-punch and also the second of the lower rock-shafts, and this second rock-shaft will operate a lower punch-bar 71, Fig. 23, which will in turn raise the first punch on the left-hand side in said figure and on the right-hand side of the machine.

It will be noted that in working out the combinations of punches for producing the many characters covered by the keyboard—namely, two hundred and fifty-five in the illustration—the mechanism is such that each horizontal row or line has a constant punch—that is to say, a punch which may be operated through one of the lower rock-bars when any key-lever in that horizontal line is operated, and in addition each of said keys will operate a different punch corresponding to the unit value or body width of the character represented by that particular key, the connections for this punch being made through the units-bars and upper rock-shaft, as before explained, the exception, however, being the right-hand column and bottom row, in connection with which it is only necessary to operate a single punch, owing to the intended use of the strip in the casting-machine or producer having two fixed stops. The so-called "constant" punch-operating mechanism is that illustrated in Fig. 23 in connection with the punches on the left-hand side of the figure, while the variable punch-operating mechanism is that illustrated in Fig. 22, from which two figures it is thought that a clear understanding of this portion of the invention may be had.

When a key-lever or any one of them is operated to form the indication in the strip or record-ribbon, it is of course necessary before the next designation is formed that the strip or ribbon shall be fed forward by the paper-feeding mechanism before described, and to secure the operation of the escapement upon the operation of any one of the key-levers each of the upper units-bars and the bars 65 and 66, as well as the right-hand bar in Fig. 22, corresponding to the right-hand column of key-levers in the machine, each carry at the upper end a lug or projection 72, which rests under and is adapted to raise the bail 31 of the feed-shaft 30, whereby when any one of said units-bars is raised the said feed-shaft 30 will be oscillated, and through the before-described connection 29 with the pawls the escapement will be operated, and as the units-bars and key-levers return to normal position the escapement-wheel will be allowed to advance and feed the paper forward a proper distance.

The spring 28, which draws the escapement-pawls back to normal position, it will be observed, is relatively long to secure a uniform tension throughout a somewhat wide range of movement, and in addition to returning the escapement-pawls to their normal position it also serves to put a tension on the punch-operating mechanism and key mechanism generally for returning them to their proper positions with an elastic pressure, as it will be observed that when the units-bars raise the feed-shaft bail the tendency of said bars is to return to their normal position under the influence of this spring, as well as under the influence of gravity. The punch-bars themselves are also provided with lugs or projections 73, also resting under the feed-shaft bail and serving to return the punch-bars to their lower position, or, on the other hand, said projections 73 when the punch-bars are raised or any one of them is raised will insure the operation of the feed-shaft and a consequent feeding of the paper the desired distance.

*Justifying mechanism and mechanism for operating the same.*—This mechanism is designed to provide for indicating to the operator exactly which justification-keys are to be struck for producing indications of the amount of body thickness setwise which is to be added to each of the justifying type-bodies in any given line. It is one of the objects of the invention to provide a mechanism which will register accurately the number of units setwise in the characters previously indicated in the record strip or ribbon in any given line by causing an indicating-hand to register with a suitable chart, dial, or card or the like bearing upon it combinations of letters or figures corresponding to the justifying-keys, which latter when struck will produce perforations or indications representing the exact increment or body width to be added to each of the justifying type-bodies to produce a perfectly-justified line, thereby eliminating from the problem all mental calculation on the part of the operator and enabling him to, by simply consulting the chart, card, or dial, strike proper justification-keys at the termination of each line of indications.

The invention contemplates the employment of a units-wheel which is advanced or given an angular movement corresponding with or in definite proportion to the number of units contained in each one of the characters designated in the record-strip, a chart bearing the requisite justification-key indications, (letters or numbers corresponding to similar letters or numbers on the justification-keys themselves,) and a justification-indicator which is advanced each time one of the types, the body of which is varied to produce justification, is indicated, so as to register with a line on the chart corresponding to the number of type-bodies contained in the line of type or indications thereof in the record-ribbon, provision being also made for securing a relative movement of the indicator and chart for showing the amount of unfilled justification-space remaining in the line, this being preferably, as before stated, simply by reference to the proper justification-keys to be struck for indicating the justification in the record-ribbon.

Obviously the indicator itself may be swept across the dial or chart for showing the amount of justification-space, or the dial or chart may be moved to secure the same result; but in the present machine the first-mentioned plan has been adopted—that is to say, there is a fixed dial or chart and a justification-indicator which is moved transversely of the chart in accordance with the number of justifying type-bodies indicated and longitudinally of the chart in accordance with the body widths or unit values in the portion of the line not previously designated.

Referring particularly to Figs. 1, 2, and 20, it will be seen that on the front of the casing, preferably on the middle section 2 thereof, there is mounted removably upon studs 74 a chart 75, which is shown as substantially segmental in form, although, as will presently appear, the lines of characters thereon are not true arcs of a circle, but are spiral for adapting them to register with the particular indicating-hand or pointer employed.

The units-wheel 76, Figs. 10, 11, 12, 13, and 14, is a toothed wheel, preferably journaled in a frame 77, which also preferably supports most of the registering mechanism. The shaft upon which the units-wheel is mounted preferably takes the form of a sleeve 78, Fig. 14, and the face of the units-wheel is provided with a clutch-section 199, with which a longitudinally-movable pinion-sleeve 79, Figs. 4 and 14, engages to rotate the units-wheel forwardly, but which will permit the pinion 79 to rotate in a reverse direction without rotating the units-wheel itself. The pinion is held in engagement with the clutch-section by means of a spring 80, inclosed in a casing 81, carried by the units-wheel and surrounding the rear end of the pinion-sleeve. The pinion constituting the forward end of this sleeve 79 is adapted to mesh with a rack-bar 82, Figs. 13 and 27, and the motor or weight for driving the indicator is applied to this rack-bar and tends to advance the same across the machine toward the right-hand side. In the preferred construction the rack-bar 82 extends out to the left-hand side of the casing and meshes with a gear-wheel 83, journaled in a bracket 84 and carrying a smaller gear-wheel 85, with which a vertical rack 86 meshes. The rack 86 is guided in suitable ways in the bracket 84, and from its lower end the weight 87 for moving the parts is suspended. This weight may be called a "prime-motor" weight, and the connection between it and the rack 86 is a yielding connection, preferably formed by confining a spring 88 in the weight and extending a rod 89 down through the spring and providing its lower end with a nut or enlargement 90, upon which the lower end of the spring will rest. The spring thus forms the real motor, the tension of which is determined by the weight, and the impact of the weight when once set in motion by the downward movement of the rack will not impart a shock to the mechanism.

The forward movement or rotation of the units-wheel is normally prevented by the locking-pawl 91 having its end toothed to accurately fit and center the teeth on the units-wheel, said pawl preferably being mounted in bearings to slide radially with relation to the wheel.

Above the units-wheel and pivoted on a center 92 is a units-rack carrier 93, Fig. 11, having ways therein in which a units-rack 94 reciprocates in a plane tangential to the periphery of the units-wheel and in position to mesh and coöperate with said units-wheel whenever the carrier 93 is depressed. The units-rack 94 is provided with a stop or projection 95, normally adapted to arrest the movement of the units-rack in each direction by coming in contact with the ends of the slot or way in the carrier in which it is mounted unless arrested by the units-stops, to be presently described. In the operation of the machine or upon the depression of any of the finger-pieces the units-rack-bar carrier is first depressed until the units-rack is in mesh with the units-wheel, and then the locking-pawl 91 is withdrawn, allowing the units-wheel to advance in accordance with the range of movement of the units-rack, and upon the release of said key the locking-pawl 91 is first moved into engagement with the units-wheel, and then the units-rack moves out of mesh therewith. Hence it will be seen that the advance of the units-wheel is directly controlled by the range of movement allowed the units-rack, and this is varied in accordance with the number of units contained in the body of the type designated by any particular finger piece or key.

For securing the relative movements of the units-rack carrier 93 and the locking-pawl 91, just described, a bell-crank lever 96 is journaled at its angle on the frame 97, and one of its arms extends downwardly and coöperates with the locking-pawl 91, Fig. 11, while its other arm extends horizontally and has connected to it a link 97, extending vertically, and this link 97 is in turn connected with a horizontal link 98, having its opposite end pivotally connected with the units-bar-rack carrier at 99.

The link 98 is centrally pivoted to a depending connecting-rod 100, which at its upper end is supported by an arm 101, pivoted at one end on the casing and at its opposite end pivotally connected with an arm 102, Fig. 8, on the feed-shaft 30. Thus when the feed-shaft 30 is oscillated by the operation of any one of the key-levers the connecting-rod 100 will be depressed against the tension of the spring 28.

A spring 103, Fig. 13, is connected at one end to the units-rack-bar carrier 93 and at the opposite end to the frame 77 and by its tension tends to draw said rack-bar carrier and rack-bar down into engagement with the units-wheel; but the superior strength of the spring 28 overcomes the tension of the spring 103 and normally holds said rack-bar carrier 93 up and the rack-bar out of engagement with the units-wheel. Because of this arrangement it will be seen that the link 98 operates as a lever, and as the link or connecting-rod 100 moves downwardly the spring 103, also drawing down on the rack-bar carrier 93, will hold the outer end of the link 98 upwardly and the locking-pawl 91 in engagement with the wheel until the rack-bar is in engagement with the units-wheel and the rack-bar carrier comes to rest against its stop 104, when the outer end of the link 98 will be swung downwardly by the further movement of the connecting-rod 100, and this in turn will swing the bell-crank 96 and withdraw the locking-pawl 91 from engagement with the units-wheel, permitting the wheel to turn and carry with it the units-rack. On the reverse movement of the feed-shaft and connecting-rod 100 the spring 103, still exerting its tension, will cause the link 98 to act as a lever until the locking-pawl 91 comes to rest in engagement with the units-wheel, and then as the outer end of the link cannot move upwardly any farther its inner end will be swung upwardly, raising the units-rack carrier 92 and disengaging the rack from the units-wheel.

For returning the units-rack 94 to its normal position in its carrier, which is the position indicated in Fig. 11, a link 105 is connected to its rear end and extends out to one end of the frame 77, where it is jointed to a vertical lever 106, pivoted to the frame 77 and having a spring 107 for drawing it outwardly. The opposite end of this spring 107 for convenience is connected with an arm 108, extending out from the frame 77.

The mechanism for limiting the movement of the units-rack and units-wheel coöperates with the units-rack directly and in the present embodiment embraces a series of stops, fifteen in number, and the extreme range of travel of the units-rack to the end of its slot or way constitutes another stop, making sixteen in all.

The number of stopping-points of the units-wheel and rack-bar correspond, therefore, to the number of vertical columns of characters in the keyboard, having different body widths, there being fifteen of such vertical columns, and the other stop is for the normal-space indication, the character for which has a less number of units of body thickness therein than any one of the columns.

By reference to Fig. 13 it will be seen that the units-rack carrier 93 is provided with a series of vertical slots or guides 109, and the forward ends of a series of stop-levers 110, Fig. 17, are adapted to play in these slots or guides. In order to reduce as much as possible the lateral space occupied by the stop-levers and at the same time to secure the advantages of independent guides for the forward ends of the levers as near as possible to the point where the units-rack strikes the same, only one-half of the total number of stop-levers are adapted to project into such guides, and between each of the levers which do project into these guides there is arranged a second series of stops 111, Fig. 17, the stop-levers 111 being provided with downwardly-extending nose portions 112, which project between the levers 110, and an overhanging portion 113, which when any one of the series 111 is depressed will carry with it the next lever of the series 110, and thus each of the series of levers 111 when depressed carries with it its supporting-lever of the other series, and the strain is taken up by the guide 109, in which the lever 10 works. The stops when thus arranged, it will be observed, may individually be comparatively loose and free in action, thereby preventing any sticking or liability to catch in the guides, and, furthermore, by providing individual guides for holding each lever the wear incident to the use of the levers is not cumulative in its action on the units-wheel, and the error due to this or due to the accumulation of dirt is reduced to practically nothing. The stop-levers are journaled on a through-pin 196, and their rear ends are rounded for coöperation with slots in a vertical series of stop-bars 114, Figs. 4, 7, 8, 10, 21, 23, and 25. These stop-bars are supported in guides at top and bottom of the intermediate section 2 of the casing, and at an intermediate point they are also held against lateral movement by guides 115, carried on a central transverse rod 116. Centrally they are provided with slots 117, Figs. 18 and 25, for the reception of the rounded rear ends of the stops 110 and 111. The stop-bars correspond in number to the number of stops 110 and 111, an additional one being provided for the space stop and key before described.

One of the stop-bars is designed to be operated from each of the vertical columns of key-levers, and in order to accomplish this the stop-bars are each provided on their rear edge with a projection 118, which overlies and is adapted to be operated by the bail on one of the upper rock-shafts. These rock-shafts, it will be remembered, correspond to and are operated by the respective vertical columns of key-levers. Referring again to Figs. 22 and 23, it will be remembered that the space-key alone operates the next to the bottom rock-shaft of the upper series, and if reference be had to Fig. 23 it will be seen that this rock-shaft operates the first stop-bar of the series 114, and when this first stop of the series is operated the first stop toward the left-hand side of the machine and the first with which the rack can come in contact will be depressed, and hence when this stop is operated the units-wheel will be given a minimum feed corresponding to the body width of the space. The intermediate stop-bars and stops corresponding thereto will give a different feed, in accordance with the body width of the characters designated by the intermediate columns of key-levers, each being operated from its appropriate rock-bar of the upper series; but the extreme right-hand column, it will be remembered and as shown in Figs. 22 and 23, does not operate any of the rock-bars of the upper series, but only the feed-shaft. Hence when any key-lever in this column is moved to produce a character indication no movable stop is thrown into the path of the units-rack; but said rack is permitted to have a full stroke and come to rest against the fixed stop at the end of its guides, registering the maximum number of units of body width.

To arrange the mechanism in as compact form as possible, the units-rack is provided with the projection 95 for directly coöperating with the stops, and thus the rack itself may be extended on either side of said projection a sufficient distance to insure engagement with the units-wheel for a maximum throw without requiring the location of the stops beyond the end of the rack.

It will be observed that the units-wheel has a progressively-forward movement. In other words, it is never given a reverse rotation even when the driving-rack 82 is returned to its normal position ready to again advance the units-wheel, for during such return movement the ratchet connection between the sleeve 79 and the units-wheel allows the sleeve and rack to move reversely independently of the units-wheel.

The justification-arm 119 is mounted on or formed as a portion of a pinion 120, Fig. 14, and the rotation of this pinion by the rack gives a relative movement of the justification-arm and chart for indicating the amount of justification-space left in a line, and inasmuch as the justification area or that portion of the line wherein justification must be taken into consideration by the operator is only a relatively small proportion of the whole line it is obvious that this justification hand or arm need not be moved continuously, but its movement must commence when the rack and units-wheel have together moved throughout a large portion of the line indicated. To secure this result, the justification-arm and pinion 120 are directly operated by the supplemental rack 121, (shown clearly in Fig. 27,) guided in ways in the frame 77, and adapted to be stopped in normal position by a lug or projection 122, which abuts against the frame 77, when the supplemental rack is at the left-hand extreme of its movement. A pick-up projection 123 on the main rack 82 is adapted to coöperate with the supplemental rack 121 as the justification area is reached to move the same toward the right-hand side of the machine, and thereby rotate the pinion 120 and justification-arm 119. As the main rack 82 returns to its first position at the left-hand side of the machine obviously the projection 123 will move out of engagement with the supplemental rack 121, and the justification-arm is therefore freed from its influence until the main rack 82 advances again far enough to move the same—i. e., when the justification area is reached.

For returning the justification-arm and supplemental rack to normal position without imparting thereto an undue momentum or breaking or bending the mechanism should the justification-arm get caught or stopped in its return movement a vertical rack 124 also meshes with the pinion 120, Figs. 8, 10, and 14, and is itself carried by a weight 125, Figs. 10, 13, 14, and 16, sliding on a vertical guide 126. This weight will serve to return the justification-arm to its normal position; but it is desirable that the returning power for the justification-arm should be increased as the arm reaches the last portion of its travel, and to accomplish this a lever 126 is pivoted on the frame 77, its longer arm extending into a position where as the weight 125 rises it will contact therewith and swing the lever on its pivot. The lever is spring-pressed, a spring 128, connected with the shorter arm of the lever, being employed for the purpose, and consequently, while the weight itself operates alone as the returning power during the last portion of the return movement of the justification-arm, during the first portion of such movement the action of the weight is supplemented by the action of the spring-pressed lever 127, and at the same time the lever 127 is arrested in its action by striking the frame 77 when the justification-arm passes its center of gravity, after which time its own weight will tend to return it to normal position.

During the time that the supplemental rack 121 is being moved by the main rack 82 it is of course desirable that the two racks should be locked together to prevent any possible overthrow or independence of action, and for the purpose of locking them a pawl 129, Fig. 10 and dotted lines Fig. 27, is pivotally mounted upon the main rack 82 and adapted to drop into a notch 130 in the supplemental rack at the instant when the pick-up projection 123 engages the supplemental rack, thereby locking the two together for unitary movement. The pawl 129 is disengaged from the supplemental rack for the independent return of the two racks by an arm 131, operated through the mechanism to be presently described, either when the justification-key is operated at the end of the line or when the resetting mechanism commences its operation, as will be presently described.

From Fig. 20 it will be seen that the dial or chart is divided off into a series of spirally-arranged rows of combinations of letters radially divided, which correspond to letters on the two uppermost rows of keys or finger-pieces, these being the justification-keys. The number of such rows of letters on the chart, counting radially, correspond to the number of possible justification type-bodies in a given line, and the indicator for registering with such letters on the chart is adapted to be advanced transversely of the chart so as to register with a new row thereon each time one of the justification-type is indicated on the paper or ribbon, and the letters in that row with which the indicator registers will show the proper justification-keys to be operated for producing indications which will in the casting or reproducing machine cause the mechanism to vary the body widths of the justification-types to the proper extent.

The justification-indicator 132, Figs. 1, 2, and 14, is a pointer or hand carried by the justification-arm 119, and while it is adapted to swing on its center in unison with said arm it is given a longitudinal movement each time one of the type the body of which is varied for justification is indicated. Each longitudinal movement of the justification-indicator 132 will cause it to register with a new line of letters on the chart, for which purpose it is mounted in guides 133 on the justification-arm 119 and its inner end formed into a rack-bar 134, adapted to mesh with a pinion 135, Figs. 2 and 14, carried upon a shaft 136, extending through the sleeve-shaft 78 of the units-wheel and carrying upon its rear end a second pinion 137. Pinion 137 meshes with a vertical rack-bar 138, Figs. 12 and 14, guided in suitable guides on the frame 77 and preferably weighted so as to normally remain in its lowermost position, but adapted to be moved upwardly by the operation of the key-levers for indicating type-bodies whose body thickness is varied for justification. The two type-bodies in which such justification is produced in the present apparatus, it will be remembered, are the space-type and the full-stop type, and the key-levers for these two type indications, it will also be remembered, oscillate or rock the lowermost of the upper series of rock-shafts, together with its bail, and if reference be had to Fig. 4 it will be seen that this rock-shaft carries a forwardly-projecting arm 139, having upon its forward end a pivoted pawl 140, provided with a spring 141 for holding it in its operative position. The rack-bar 138 has upon its side a series of ratchet-teeth 142, with which, from Fig. 15 it will be seen, the pawl 140 is adapted to engage whenever the lower rock-shaft is operated by either one of the two before-mentioned key-levers; but normally the pawl 140 is out of engagement with the ratchet-teeth 142 of the rack 138, being held with its nose elevated by means of a throw-out incline 143, and off of which it will ride whenever the lower rack-bar is oscillated, thereby raising the rack-bar 138 one tooth or a sufficient distance to cause the justification-indicator 132 to register with a new line of characters on the chart. The throw of the pawl 140 is limited and the rack-bar locked by an adjustable stop 144, Fig. 15, and when the rack-bar is so moved it is caught and held by a pawl 145, Figs. 8 and 9, which is normally held in position to engage with the ratchet-teeth by the spring 146, this latter pawl, however, being adapted to be thrown out of engagement with the rack-bar to permit the rack-bar to drop and so retract the justification-indicator through the medium of mechanism thrown into action either by the justification-keys when operated or by the resetting mechanism, as will presently appear.

The object of having the lines of characters on the chart spiral rather than concentric with the center on which the justification-hand turns will now be apparent, for assuming that the space and full-stop keys are not operated, but that other character-keys are operated, the justification-arm will be rotated as soon as the justification area is reached, and inasmuch as the pinion 135, controlling the justification-indicator, is not moved except when either the space or the full-stop key is operated the justification-indicator will be carried around such pinion 135 and its indicating point or hand will be moved with respect to the justification-arm 119. The spiral arrangement of the characters on the chart is such as to accord with this movement, and thus if no space or full stops are included in the line the justification-indicator will follow around on a single line of chart characters, and, regardless of the position of the justification-arm 119, whenever one of the said keys (space or full-stop keys) is operated the justification-indicator will be moved outward radially to register with a new line of characters on the chart.

The rack 138 is preferably only provided with a sufficient number of ratchet-teeth to move the indicator across the chart or dial, and thus no injury can result from a too-frequent operation of the space or justifying character key or keys.

For insuring the operation of the units-rack carrier in unison with the stop-bars 114 or any one of them said stop-bars 114 are each provided near their upper ends with a projection or lug 191, Figs. 8, 23, and 25, which underlies the bail 31 on the feed-shaft 30. Thus there is a direct interdependence or coaction between the stop-bars and the units-rack carrier, insuring the operation of the units-rack carrier and the locking-pawl whenever one of said stop-bars is operated to throw a stop into the path of the units-rack.

*Line-indicator.*—In the front plate of the intermediate section 2 of the casing there is formed a transverse slot 147, preferably located below the chart, and along the edges of the slot there is provided a line-scale 148, with which registers a pointer 149, carried by the main rack 82, Figs. 2, 7, and 27. The rack 82 advances upon the operation of each of the key-levers and the line-scale pointer 149 will consequently indicate to the operator exactly the point of starting a line or the approximate amount of space remaining in the line at any moment.

In the brackets 84, Fig. 13, it will be noticed that there is arranged a fixed rack 150, and sliding upon suitable guides in proximity to this rack there is a stop-block 151, which may be adjusted longitudinally of the fixed rack 150 by withdrawing the holding-pawl 152 from engagement with the rack 150 and allowing it to again enter at the desired point of adjustment under the influence of its spring 153. This stop-block 151 serves as the stop for limiting the retrograde movement of the main rack 82. Hence the adjustment of this block, in connection with the line-indicator 149, will enable the length of any particular line to be accurately gaged.

For indicating to the operator audibly when the line is approximately full an alarm or gong 154 is mounted on the casing, and its striker 155 is adapted to be engaged and operated by an arm or projection 156, Fig. 7, when the rack has advanced to the proper point. This audible alarm is preferably so located that it will be sounded when the justification area is reached, and the operator, hearing it, may then consult the chart and ascertain exactly how much justification-space remains, whether additional characters may be struck, and, if not, exactly which of the justification-keys (shown in Fig. 7) are to be operated to set the reproducing-machine for increasing the body thickness of the justification characters to exactly fill the line.

*Resetting mechanism.*—At the right-hand side of the machine, Figs. 1 and 3, there is pivoted a resetting handle or arm 157, normally held elevated by a spring 158, and with this arm is connected, through a spring-link or yielding connection 159, a vertically-moving rack-bar 160. Rack-bar 160 is suitably guided in the bracket 84 and is adapted to mesh with a gear-wheel 161, keyed to a shaft 162, upon which the gear-wheel and pinion 83 85 are journaled. A pin 163, Fig. 19, projecting from the gear-wheel 83, is adapted to be engaged by a similar pin 164 on the wheel 161, and in the operation of the machine for forming a complete line these two wheels 83 and 161 do not make quite a complete revolution, thus assuming that the wheel 83, which is connected for unitary movement with the rack 82, has been rotated by the weight 87, or that a line has been completed when the rack-bar 160 is drawn down by the handle 157, the pins 163 and 164 will engage and the wheel 83 be rotated in a reverse direction to return the rack-bar to its normal position and elevate the weight 87 ready for a new operation. When the handle 157 is released, its spring 158 will again elevate the rack-bar 160 and rotate the wheel 161 back to its normal position, leaving the weight elevated and causing the pin 164 to move away from the pin 163 until the handle is again depressed for again returning the parts to normal position. For again raising the weight 19 and racks 13 and 17, through which the paper is driven or advanced, another vertical rack 165 is mounted in a guide in the bracket 84 and in a second guide 166. Rack 165 is provided with an arm 167, Figs. 1 and 3, adapted when the rack is raised to rise up beneath projections 168 on the racks 13 and 17 and shaft of weight-pinion 18, and thereby raise these parts, the ratchet connections between the pinions 12 and 15 and the paper-shafts permitting this reverse movement without causing an unwinding of the paper. From Fig. 19 it will be seen that the rack-bar 165 has meshing with it a gear-wheel 169, which gear-wheel is geared on the shaft 162 and is adapted to be rotated in unison with the gear-wheel 161 whenever the resetting-handle 157 is moved. The rack 165 and the arm 167 after raising the "paper-motor mechanism" (as the two lugs and weight 19 may be termed) return to normal position, as just explained.

In resetting the indicating mechanism the holding-pawl for the justification-indicator rack must be thrown out of engagement to permit said rack to drop and draw the justification-indicator inwardly on the justification-arm. The pawl 129, connecting the main rack-bar and supplemental rack-bar 121, must be disengaged and held out of engagement until the rack-bars separate, and the units-wheel must be brought to a point which may be termed a "zero-point" and of which there may be in such an arrangement as that herein described a large number, so as to begin its registration with proper relation to the scale, or, in other words, so as to begin its registration at a proper point to insure accurate justification. It is preferable also that mechanism should be provided whereby when the last key or keys of a line—namely, the justification-keys—are struck these particular mechanisms—namely, the two rack-bar releases and the resetting of the units-wheel—should be accomplished, and there is in the present machine provision made for performing these operations when the justification-keys are struck, and in addition and in order to prevent any possible rupture of the mechanism when the resetting-handle is depressed connections are also made between the rack-bars at the left-hand side of the machine and the throw-out mechanism for the pawls, whereby even though no justification-keys are struck these parts will be properly reset.

If reference be had now to Figs. 11 and 13 it will be seen that to the frame 77 there is pivoted a vertical arm or lever 170, to the upper end of which a link 171 is connected, the opposite end of said link being pivotally connected to an arm 172 on the rock-shaft 173, carrying the pawl-releasing arm 131, Fig. 27. The lever 170 is provided with a spring 174 for holding it in its advanced position and in position to raise the arm 131. The advance movement of the lever 170 then, it will be seen, will raise the arm 131, and if the pin 175 on the pawl 129 overlies the said arm the pawl will be out of engagement with the secondary rack and the two racks disengaged. In order to at the same time release the vertical rack 138 from its holding-pawl 145, a bell-crank lever 176 (shown best in dotted lines in Fig. 14) is pivoted on the frame 77 and has one of its arms projecting in front of the lever 170, Fig. 11, and its opposite arm projecting in front of the holding-pawl 145. Consequently when the lever 170 moves forwardly this pawl 145 will be disengaged from the rack 138, and inasmuch as the operating-pawl 140 for the last-mentioned rack is normally out of engagement therewith the rack is free to drop under the influence of gravity and draw the justification-indicator back to its normal position with relation to the justification-arm.

To prevent the lever 170 from advancing under the influence of its spring 174, a second lever 177, Figs. 11 and 13, is pivoted on the frame 77 and at its upper end carries a pivoted pawl 178, the end of which works in a slot in the lever 170 and is adapted to hook over the same, as shown clearly in Fig. 11. Also connected with this lever 177 is a link 179, the opposite end of which link is pivotally connected with a lever 180, Fig. 14, pivoted just outside of the side of the casing upon the bracket 84 and in position for its opposite end to engage a cam or incline 181 on the vertical rack 165. This incline 181 moves into operative position when the rack 165 is down in its normal position, as shown in Fig. 10, and consequently when the resetting-handle 157 begins its downward movement and the rack-bar its upward movement the lever 180 will ride off of the incline 181 and the two pawls—namely, 129 and 145—will be thrown out of engagement with the respective racks. On the other hand, when the rack returns to its normal position the pawl-release arm 131 and the bell-crank lever 176 will be moved into position for allowing the pawls to engage with the racks, this being the normal operative position of the parts.

A spring 182 is provided for insuring a return of the levers 177 and 180 into position for the reëngagement of the pawl 178, which pawl in the normal operation of the machine is adapted to be disengaged from the lever 170 by the operation of the justification-keys or any of them. To throw this pawl out of engagement, a transverse rock-shaft 183, Fig. 7, is journaled at one end in the casing and at the opposite end in the frame 77, and carries on its forward side an arm 184, which overlies the rear end of the pawl 178 in position to throw the forward end of said pawl upwardly and out of engagement with the lever 170 whenever the rock-shaft is operated. On the rear side of the rock-shaft there is mounted a bail 185, extending back into proximity to the punch-bars 36, and upon the forward edges of the constant punch-bars for the justification-keys there is formed a lug or projection 186, Fig. 4, underlying the bail 185 and in position to oscillate the rock-shaft 183 whenever either one of said constant punch-bars is moved by the operation of the justification-keys.

To reset the units-wheel 76 to a proper point where it will begin to register correctly for the next succeeding line, said units-wheel is provided on its front face with a ratchet or toothed wheel 187, Figs. 11 and 13, with which a pawl 188 is adapted to coöperate to arrest the units-wheel, and the relation of the teeth on the ratchet-wheel, the teeth on the periphery of the units-wheel, and the pawl is such that when the units-wheel is arrested with the pawl in engagement with any one of the teeth the units-wheel will be in a proper zero position for subsequent operations. The spring 189 normally tends to hold the pawl 188 in engagement with the ratchet-wheel 187, and in order to hold it out of engagement, except when the line is completed and the justification-key is struck to throw the parts into resetting position, the said pawl is connected with the lever 170 by a link 190, Fig. 13, whereby when the lever 170 has gone back the pawl will be held out of engagement; but when the lever 170 is released by the operation of any one of the justification-keys said pawl will enter between the teeth on the wheel 187, and inasmuch as when any one of the justification-keys is struck the locking-pawl 91 is drawn out of engagement with the units-wheel, just as in the case of any of the other keys in the machine, the units-wheel will advance until arrested by the pawl 188, and upon the release of the justification-key the pawl 91 will again be thrown into engagement, locking the units-wheel in its zero position.

The number of ratchet-teeth on the wheel 187 and the corresponding number of zero positions on the units-wheel should be sufficient to cause the units-wheel to reach a zero position before the units-rack comes into contact with any one of the stops, as will be readily understood, for otherwise the units-wheel would be arrested by the stop rather than by the zero-pawl 188.

*Operation of the machine.*—It is perhaps appropriate to state at this point that a number of suitable charts or dials are provided for use in connection with each machine, having combinations of characters thereon for indicating justification necessary to be added to the justification-type in different fonts of characters, and the operator, knowing the font or style of characters to be used and having selected the chart for that font and placed the same in position on the casing and having placed the previously-prepared supply-roll of paper in position, passed the same through the guides ready for the action of the punches, and attached it to the winding-roller, is ready to commence the operation of indicating in the record-strip the desired characters, with the justification-indications for controlling the justification thereof. To set the machine for operation to produce a line of given length, the operator manipulates the stop on the bracket on the left-hand side of the machine in connection with the line-scale. Having done this, he manipulates the finger-pieces or key-levers to produce indications for the desired characters, points, spaces, &c., in the line until the line is nearly completed or the justification area approached or reached, which may be ascertained by consulting the line-scale or by the audible signal sounding at the appropriate time. The operator then takes notice of the justification-indicator, and seeing that he has no more room in the line for other characters he will find that the justification-indicator registers with a combination of characters on the chart which corresponds exactly to the keys in the justification-rows of keys which are to be operated to produce justification indications corresponding to the increment in body thickness of the justification-type necessary to produce a complete and justified line in the casting-machine. As the main rack reaches the justification area and the justification-arm begins its movement, carrying with it the justification-indicator, the pin 175 on the pawl 129 rides over the arm 131 and continues its movement over the said arm until the line is completed. When the first justification-key is operated, it not only operates the desired punches for producing the indications, but it also operates the rock-shaft 183, tripping the pawl 178 out of engagement with the lever 170, and this lever being released under the action of its spring 174 will raise the pawl-releasing arm 131 and pawl, disconnecting the two racks, and at the same time it will release the pawl 145, allowing the justification-indicator to be retracted to its normal position on the arm. It also resets the units-wheel by throwing the zero-pawl into engagement with the teeth thereon and allowing said wheel to rotate forwardly until one of the teeth is arrested against the pawl. The operator then depresses the resetting-handle, drawing back the main rack, the pawl 129 meanwhile being held elevated by the arm 131 until moved out of range of the supplemental rack. This movement also raises the motor-weights, as before explained, and by raising the rack-bar 165 moves the incline 181 out of its operative relation to the lever 180, and the arm 177, carrying the pawl 178, under the influence of the spring 182, will swing inwardly, reëngaging said pawl with the lever 170. When the resetting-handle is then released, the rack-bar, returning to its normal position, carrying with it the incline 181, will operate the levers 180, 177, and 170, returning the releasing-arm for the pawls into position for allowing said pawls to reëngage and also moving the zero-pawl out of engagement with the units-wheel, the parts being then in position for subsequent operations.

Having now particularly described and ascertained the nature of our said invention and in what manner the same is to be performed, we declare that what we claim is—

1. The combination with a series of character-designating punches and a series of key-levers arranged in vertical columns and horizontal rows, whereby each key-lever is located at the intersection of a column and a row with a finger-piece for each of said key-levers, of independent connections between each vertical column of key-levers and one of the punches of the series of punches, and between each horizontal row or line of key-levers and a punch of the series of punches corresponding to said rows, whereby upon the operation of any one key-lever, a punch corresponding to the vertical column and another corresponding to the horizontal row or line in which said key-lever is located, is operated, as set forth.

2. The combination with a series of character-designating punches, and a series of key-levers, each having a finger-piece and arranged in vertical columns and in horizontal rows or lines whereby each key-lever is located at the intersection of a column and a row with connections between each of said vertical columns and a punch corresponding thereto in the series of punches, and an independent connection between each of said horizontal rows or lines and a punch corresponding thereto in said series of punches, whereby upon the operation of any key, two punches will be operated, one corresponding to the vertical column in which the key is located and the other corresponding to the horizontal row or line in which the key is located; substantially as described.

3. The combination with a series of character-designating punches, and a series of key-levers, arranged in vertical columns and horizontal rows or lines, whereby each key-lever is located at the intersection of a row and a column of a series of rock-bars for operating certain punches in the series of punches and corresponding to and operated by the vertical columns of key-levers and a second series of rock-bars for operating other punches of the series of punches, and corresponding to and operated by the horizontal rows or lines of key-levers; substantially as described.

4. The combination with a series of character-designating punches and a series of key-levers arranged in vertical columns and horizontal rows or lines, of a series of rock-bars for operating certain punches of the series of punches and having bails coöperating with the horizontal rows or lines of key-levers, a second series of rock-bars for operating certain other punches of the series of punches and connections between said second series of rock-bars and the vertical columns of key-levers; substantially as described.

5. The combination with a series of character-designating punches, and a series of key-levers arranged in vertical columns and horizontal rows or lines, of a series of rock-shafts for operating certain of the punches of the series of punches and having bails with which the key-levers directly coöperate, a second series of rock-shafts for operating certain other punches of the series of punches and units-bars for operating said last-mentioned series of rock-shafts, with connections between said units-bars and the vertical columns of key-levers; substantially as described.

6. The combination with a series of character-designating punches and a series of vertically-arranged units-bars with connections between said units-bars and punches for operating the latter, of vertical columns of key-levers for operating said units-bars, the key-levers of said vertical columns being arranged alternately on opposite sides of the units-bars; substantially as described.

7. The combination with a series of character-designating punches and vertically-arranged units-bars, operating said punches, having oppositely-extending projections or lugs thereon, a series of key-levers arranged in vertical columns corresponding to said units-bars, said key-levers being arranged alternately on opposite sides of said units-bars and adapted to coöperate with the lugs or projections thereon for operating the punches; substantially as described.

8. The combination with a series of character-designating punches, a series of vertically-arranged units-bars for operating said punches and a series of key-levers, arranged in vertical columns corresponding to and adapted to operate said units-bars, of a series of rock-shafts corresponding to the key-levers in each of said columns and adapted to be operated thereby, and connections between said rock-shafts and certain punches of the series of punches not operated by the units-bars; substantially as described.

9. The combination with a series of character-designating punches, a series of rock-shafts having bails directly coöperating with certain punches of said series to operate the same, a series of vertically-arranged units-bars for operating said rock-shafts, and a series of key-levers arranged in vertical columns, the key-levers in each column coöperating with the same units-bars, of a series of rock-shafts having bails directly coöperating with the key-levers, the key-levers in the same horizontal plane coöperating with the same rock-shaft and connections between said last-mentioned series of rock-shafts and certain of the punches of the series of punches; substantially as described.

10. In a character-designating apparatus, the combination with a series of character-designating punches and a series of key-levers arranged in vertical columns, the key-levers in each column being arranged alternately in different vertical planes, of a series of units-bars for operating the punches arranged vertically between the key-levers in each vertical column; substantially as described.

11. In a character-designating apparatus, the combination of a series of character-designating punches, and a series of key-levers arranged in vertical columns, the key-levers in each column being located alternately in different vertical planes, of units-bars for operating the punches arranged vertically between the key-levers of each column and having oppositely-extending projections with which the key-levers coöperate; substantially as described.

12. In a character-designating apparatus, the combination with a series of character-designating punches and a series of key-levers arranged in vertical columns, of a series of lower units-bars arranged vertically and corresponding to the vertical columns of key-levers and an upper series of units-bars for operating the punches resting upon and adapted to be operated by the lower series of units-bars; substantially as described.

13. In a character-designating apparatus, the combination with a series of character-designating punches and a series of key-levers arranged in vertical columns, of a series of lower units-bars arranged vertically and corresponding to the vertical columns of key-levers and an upper series of units-bars for operating the punches resting upon and adapted to be operated by the lower series of units-bars, the said upper and lower series of units-bars being arranged with their greatest widths in planes at right angles to each other to afford wide bearings at their meeting points; substantially as described.

14. In a character-designating apparatus, the combination with a series of character-designating punches and vertically-arranged upper punch-bars therefor, of a lower series of vertically-arranged punch-bars upon which said upper punch-bars rest, a series of rock-shafts for operating said lower punch-bars and a series of key-levers for operating said rock-shafts; substantially as described.

15. In a character-designating apparatus, the combination with a series of character-designating punches and vertically-arranged punch-bars therefor, of a lower series of vertically-arranged punch-bars upon which some of said punch-bars rest, rock-shafts for operating said lower series of punch-bars and thereby operating the punches, an upper series of rock-bars for operating the punches not operated by the lower series of punch-bars, vertically-arranged units-bars for operating said upper series of rock-bars and a series of key-levers, each of which coöperates with one of the units-bars and one of the lower series of rock-bars, whereby two punches are operated by each of the key-levers; substantially as described.

16. In a character-designating apparatus, the combination with a series of character-designating punches and mechanism for operating different punches of said series embodying vertically-arranged punch-bars and horizontally-arranged rock-shafts having laterally-extending bails or projections, of a series of key-levers having apertures through which said rock-shafts extend and the walls of which apertures are adapted to coöperate with the bails or projections; substantially as described.

17. In a paper-feeding mechanism, such as described, and in combination with the shaft for actuating the paper-feed wheel, and an escapement controlling the same, of a gear-wheel or pinion journaled on said shaft, a clutch interposed between said gear-wheel and shaft for permitting the reverse movement of the gear-wheel, a motor-rack in mesh with said gear-wheel, a motor-weight, a gear-wheel supporting the weight and in mesh with said rack and restoring mechanism for resetting the rack and weight.

18. In a paper-feeding mechanism, such as described, and in combination with the shaft for actuating the paper-feed wheel, and an escapement controlling the same, of a gear-wheel or pinion journaled on said shaft, a clutch interposed between said gear-wheel and shaft for permitting the reverse movement of the gear-wheel, a motor-rack in mesh with said gear-wheel, a motor-weight in gear with said rack, a vertically-movable resetting mechanism for elevating said weight and rack and coöperating projections on said resetting mechanism and motor; substantially as described.

19. In a paper-feeding mechanism such as described, and in combination with a record ribbon or strip feeding mechanism, embodying a feed-shaft, and a winding-shaft, of a single motor with differential gearing interposed between said shafts and motor whereby the movements of said shafts under the influence of said motor may vary.

20. In a paper-feeding mechanism, such as described, and in combination with a record ribbon or strip feeding mechanism embodying a feed-shaft and winding-shaft and an escapement for controlling the movement thereof, of a motor and differential gearing interposed between said shafts and motor, whereby the movements of the shaft under the influence of the motor may vary; substantially as described.

21. In a paper-feeding mechanism, such as described, and in combination with a record ribbon or strip feeding mechanism embodying a feed-shaft, a winding-shaft and an escapement, of racks in gear with said feed and winding shafts, gearing interposed between said racks and a motor applied to said gearing whereby said racks may be moved independently or in unison, under the influence of said motor.

22. In a paper-feeding mechanism, and in combination with a record ribbon or strip feeding mechanism, embodying a feed-shaft, a winding-shaft and an escapement, of racks in gear with said shafts, a gear-wheel interposed between and meshing with both of said racks and a motor-weight suspended from said gear-wheel; substantially as described.

23. In a character-designating apparatus embodying a key-controlled mechanism adapted for coöperation with a record ribbon or strip, and in combination therewith, a record ribbon or strip feeding mechanism embodying a feed-shaft and a winding-shaft, and a motor, with differential gearing interposed between said shafts and motor whereby the movements of the shafts under the influence of said motor may be varied; substantially as described.

24. In a character-designating apparatus, the combination with the character-designating mechanism having controlling-keys and adapted to coöperate with a record ribbon or strip, of a record ribbon or strip feeding mechanism embodying a feed-shaft and a winding-shaft, a motor, gearing interposed between said motor and both of said shafts and a resetting mechanism for restoring the power of said motor; substantially as described.

25. In a paper-feeding mechanism, such as described, and in combination with a record ribbon or strip feeding mechanism embodying a feed-shaft and a motor therefor, of an escapement-wheel for said shaft, stiff and limber pawls for coöperating with the said wheel, a longitudinally-movable shaft on which said pawls are mounted to oscillate transversely of the escapement-wheel, bearings in which said shaft is mounted and an adjustable stop for the forward end only of said shaft whereby the shaft is free to move rearwardly in its bearings; substantially as described.

26. In a paper-feeding mechanism, such as described, and in combination with a record ribbon or strip feeding mechanism embodying a feed-shaft and a motor therefor, of an escapement-wheel for said shaft, stiff and limber pawls for coöperating with said wheel, a longitudinally-movable shaft on which said pawls are mounted to oscillate transversely of the escapement-wheel, bearings in which said shaft is mounted and a transverse arm constituting a finger-piece for throwing said pawls out of engagement with the escapement-wheel, and means for limiting the movement of the pawl-shaft in one direction; substantially as described.

27. In a character-measuring mechanism for a machine such as described, the combination with a units-wheel controlling the movement of the indicator and having a progressively-forward movement with mechanism for controlling its movement in accordance with the body widths of the characters, of a motor mechanism for impelling said wheel forwardly with a clutch connection interposed between said motor and wheel, and a resetting mechanism for the motor, whereby the wheel may be held against backward movement; substantially as described.

28. In a character-measuring mechanism for a character-designating machine, the combination with the units-wheel, having a progressively-forward movement, with mechanism for controlling such movement in accordance with the body widths of the characters designated, of an indicator controlled by said wheel, a motor for impelling the wheel and a clutch interposed between the wheel and the motor.

29. In a character-measuring mechanism for a character-designating machine, such as described, the combination with the units-wheel having a progressively-forward movement with means for controlling such movement in accordance with the body widths of the characters designated, of a motor connected with said wheel through a clutch connection for advancing it, and an indicator controlled by said wheel and a setting mechanism for arresting the movement of said wheel at a zero-point.

30. In a character-measuring mechanism for a designating-machine, such as described, the combination with a units-wheel, its shaft and the rack-bar engaging a pinion on the units-wheel shaft and controlling the line-indicator, of the units-rack reciprocating in ways in a pivoted support and a locking-pawl for the units-wheel with mechanism intermediate said locking-pawl and units-rack, whereby when the units-rack is moved into engagement with the wheel, the pawl will be withdrawn and the units-wheel abandoned to the control of the units-rack.

31. In a character-measuring mechanism for a designating-machine, such as described, the combination with the units-wheel, its shaft, a rack-bar engaging a pinion on the units-wheel shaft, a motor for advancing the said rack-bar and units-wheel and an indicator controlled by said units-wheel, for indicating the extent of such movement, of the units-wheel rack reciprocating in ways in a pivoted support, a locking-pawl for the units-wheel, mechanism intermediate said locking-pawl and units-rack, whereby when the rack is moved into engagement, the pawl is disengaged from said wheel, abandoning the wheel to the control of the rack, and a clutch interposed between the units-wheel and the pinion carried by the units-wheel shaft.

32. In combination with a units-wheel, the units-rack, the pivoted support for said rack, and the locking-pawl, of the series of stop-bars operating through intermediate connections to move the units-rack support and withdraw the locking-pawl, and a series of stops controlled by said bars for arresting the movement of the units-rack.

33. In combination with the units-wheel, the units-rack, the pivoted support for said rack, and the series of stops working transversely of said support to limit the movement of the rack, of a locking-pawl and an operating mechanism for said stops with intermediate connections between said stop-operating mechanism, the units-rack carrier and the locking-pawl, whereby when any one of said stops is operated, the units-rack will be thrown into engagement with the wheel and the locking-pawl out of engagement therewith, and a motor for advancing the units-wheel; substantially as described.

34. In a character-designating apparatus, the combination with an indicator, for indicating the space occupied by said characters, a units-wheel controlling said indicator and a feed-shaft, of a locking-pawl for the units-wheel, a units-rack for limiting the movement of the units-wheel, a units-rack carrier for moving the rack toward and from the units-wheel, a link connected at one end with the units-rack carrier and at the opposite end with the locking-pawl and an intermediate connection between said link and the feed-shaft, whereby said link will operate as a lever to secure the proper sequence of movements of the rack-carrier and pawl.

35. In a character-designating apparatus, the combination with an indicator and units-wheel controlling the same, a locking-pawl for said units-wheel and a units-rack for limiting the movement of said units-wheel when released by the locking-pawl, of a units-rack carrier movable toward and from the units-wheel, a link pivotally connected at one end with said units-rack carrier and at the opposite end with the locking-pawl and an operating rod or connection pivotally connected with said link at an intermediate point, whereby said link will move both the units-rack carrier and locking-pawl, but will permit them to move independently in order that the units-wheel may be held under control at all times.

36. In a machine such as described, comprising character-designating apparatus, and an indicating mechanism the combination with a units-wheel controlling the indicating mechanism a units-wheel rack mounted to reciprocate in ways movable toward and from the units-wheel, and a locking-pawl, of a series of stops with which said units-rack coöperates to limit the movement of the units-wheel, said stops being arranged in two series, the stops of one series forming the supports for the stops of the other series but capable of moving independently thereof; substantially as described.

37. In a character-designating apparatus, such as described, and in combination with the units-wheel thereof, adapted to advance in accordance with the body widths of the characters designated, of a units-rack adapted to engage said units-wheel, a series of pivoted stops with which said rack coöperates to arrest the movement of the units-wheel and a guide or slot for each of said pivoted stops; substantially as described.

38. In a character-designating apparatus, such as described and in combination with the units-wheel thereof adapted to advance in accordance with the body widths of the characters designated, and a units-rack, of a units-rack carrier movable toward and from the units-wheel, a series of guides or slots in said units-rack carrier and a series of stops working in said slots and adapted to arrest the movement of the units-rack and units-wheel; substantially as described.

39. In a character-designating apparatus, such as described, embodying a units-wheel adapted to advance in accordance with the body widths of the designating characters, and in combination with said units-wheel, of a units-rack, a units-rack carrier movable toward and from the units-wheel and having a series of slots or guides therein, a series of long stops working in said slots or guides, a series of short stops arranged intermediate said long stops and having overhanging portions adapted to coöperate with and move the long stops, whereby when any one of said handle and last-mentioned rack for reënergizing the motor and restoring the units-wheel-impelling rack to normal position; substantially as described.

50. In a character-designating apparatus, the combination with the character-designating mechanism the indicating mechanism embodying a units-wheel adapted to be advanced in accordance with the body widths of the characters designated, and a motor-rack for advancing said units-wheel, of a motor-weight and an elastic connection between said motor-weight and rack whereby shock incident to the momentum of the weight is avoided.

51. In a character-designating apparatus, the combination with character-designating mechanism, a paper or record strip feeding mechanism embodying a weight-motor and a rack for connecting the same with the paper-feeding mechanism and an indicating mechanism embodying a motor-weight and a rack for communicating power therefrom to the indicating mechanism, of a resetting mechanism for elevating both of said motor-weights; substantially as described.

52. In a character-designating apparatus, the combination with character-designating mechanism, a paper or record strip feeding mechanism embodying a weight-motor and a rack for connecting the same with the paper-feeding mechanism and an indicating mechanism embodying a motor-weight and a rack for communicating power therefrom to the indicating mechanism, of a resetting mechanism embodying a vertically-movable rack for raising the paper-feed-motor weight, a resetting-handle and a rack and gear for raising the indicator-mechanism weight and the vertically-movable rack; substantially as described.

53. In an apparatus such as described, the combination of the following elements, to wit, a series of keys for characters of unvarying widths, one or more keys representing characters or spaces variable as to width, a series of keys representing different degrees of variation for the variable characters or spaces, a chart containing a plurality of rows or sets of characters, the latter having reference to keys of the series representing variation in width of the variable characters or spaces, an indicating mechanism controlled by the keys for the unvarying and variable width characters or spaces, for shifting the relative positions of the indicator from one character to another in a set or row, and independent connections controlled by the keys for variable-width characters or spaces, for shifting the relation of the chart and indicator from one row or series of characters to another, whereby the operation of any key of the series denoting characters or spaces of variable widths, will effect a transfer from one set or series of charted characters to another; substantially as described.

54. In an apparatus such as described, the combination with designating mechanism embodying character-designating keys, some one or more of which designate characters, the body widths of which are adapted to be varied for justification, of an indicating mechanism embodying a chart having sets or rows of characters referring to different numbers of characters in a line, the body widths of which are adapted to be varied, and the characters in each set or row of which have reference to the normal body width of the characters designated, and a pointer or indicator for registering with said characters on the chart, said chart and pointer or indicator being adapted to be moved with relation to each other in two directions, the movement in one direction being controlled by all of the character-designating keys, causing registration with different characters in each row or set and the movement in the other direction being controlled by the key or keys for designating characters whose body widths are to be varied, for causing registration with different sets or rows of charted characters.

55. The combination in an apparatus such as described, embodying designating-keys, some one or more of which designate justification characters adapted to have their body widths varied, of an indicating mechanism embodying a chart having rows or sets of characters, each row or set having reference to a given number of justification characters in a line, and a pointer or indicator for registering with the characters on said chart, connections between said designating-keys and the indicating mechanism for varying the relative positions of the pointer or indicator and characters in each set or row on the chart, and independent connections between the justification-character-designating key or keys and the indicating mechanism for varying the relative positions of the pointer or indicator and the sets of characters on the chart; substantially as described.

56. The combination in an apparatus such as described, embodying character-designating keys, and a units-wheel controlled by the character-designating keys, of an indicator controlled by the units-wheel and connections between the said indicator and character-designating keys independent of the units-wheel for imparting to the indicator a movement in addition to the movement controlled by the units-wheel; substantially as described.

57. The combination in an apparatus such as described, embodying designating-keys, some one or more of which designate justification characters adapted to have their body widths varied and a units-wheel controlled by the designating-keys, of an indicator controlled by the units-wheel and connections between the said indicator and the justification-character-designating key or keys independent of the units-wheel for imparting to the indicator a movement in addition to the movement controlled by the units-wheel; substantially as described.

58. The combination in an apparatus such as described, embodying designating-keys, some one or more of which designate justification characters, adapted to have their body widths varied and a units-wheel controlled by the designating-keys, of a justification-arm controlled by the units-wheel and a justification-indicator movably supported by said arm with connections between the justification-indicator and the justification-character-designating key or keys; substantially as described.

59. The combination in an apparatus such as described, embodying designating-keys, some one or more of which designate characters adapted to have their body widths varied, a units-wheel controlled by the designating-keys and a justification-chart, of a justification-arm controlled by the units-wheel, a justification-indicator for registering with the chart mounted to move longitudinally on the justification-arm and connections between the justification-indicator and the justification-character-designating key or keys; substantially as described.

60. The combination in an apparatus such as described, embodying character-designating keys, some one or more of which designate justification characters adapted to have their body widths varied, a units-wheel controlled by the designating-keys and a justification-chart, of a pivotally-supported justification-arm controlled by the units-wheel, a justification-indicator for registering with the chart and connections between the justification-indicator and the justification-character-designating key or keys arranged on an axis coincident to the axis of the justification-arm; substantially as described.

61. In a keyboard, the combination of the following elements, to wit; designating-keys for designating characters having constant but different body widths; a designating key or keys for designating characters or spaces having variable body widths; a units-wheel controlled by the designating-keys and having an angular movement proportioned to the relative normal body width of the characters designated; an indicator moved by but movable independently of said units-wheel and independent connections between said indicator and the key or keys for designating characters of variable body widths; substantially as described.

62. In a character-designating apparatus, the combination of the following elements, to wit; keys for designating characters having constant body widths; a key or keys for designating characters or spaces having variable body widths; a units-wheel having an angular movement controlled in its extent by the character-designating keys; an indicator controlled by the units-wheel for indicating the space occupied by the character designated in a given line but movable independently of said units-wheel and connections independent of said units-wheel between the indicator and the key or keys for designating characters having variable body widths, and a chart with which said indicator registers having sets or rows of characters thereon; substantially as described.

63. In an apparatus such as described, for designating characters in a record strip or ribbon, the combination of the following elements, to wit; keys for designating characters having constant body widths; a key or keys for designating characters or spaces having variable body widths; keys for designating justification; a units-wheel controlled in its advance movement by said character and space designating keys in accordance with the widths of the characters designated; a justification-arm movable in unison with said units-wheel, a justification-indicator radially movable on said arm; independent connections between said justification-indicator and key or keys for designating characters having variable body widths; and a chart with which said justification-indicator registers having sets of characters corresponding to the number of possible operations in any one line of the key or keys for designating characters having variable body widths; substantially as described.

64. In a keyboard the combination with character-designating keys for designating characters of constant body width and a key or keys for designating characters having variable body widths, of a units-wheel controlled by said character-designating keys and an adjustable chart; a justification-arm rotated by said units-wheel; a radially-movable indicator carried by said arm for registering with the chart, a rack-bar and pinion controlling said justification-indicator and connections between said pinion and the key or keys for designating characters having variable body widths; substantially as described.

65. In a keyboard, the combination with character-designating keys embodying a key or keys for designating characters having a variable body width, a units-wheel controlled by said character-designating keys, and a chart, of an angularly and radially movable indicator, with connections between said indicator and units-wheel for moving the same angularly and connections between said indicator and the keys for designating variable characters for moving the indicator radially; substantially as described.

66. In a keyboard, the combination with the character-designating keys embodying a key or keys for designating characters having a variable body width, a units-wheel controlled in its angular movement by said character-designating keys, an arm adapted to be controlled in its angular movement by said units-wheel and carrying a radially-movable justification-indicator, a rack-bar and pinion controlling the radial movement of said indicator, and a second rack-bar controlling the movement of the pinion and a pawl moved by the variable-character-designating key or keys for advancing last-mentioned rack-bar; substantially as described.

67. In a character-designating mechanism, the combination with the following elements, to wit; keys for designating characters having constant body widths; a key or keys for designating a character or characters having variable body width and keys for designating justification, of an indicator advanced by the operation of the key or keys for designating characters of variable body width, and connections between the justification-designating keys and the indicator-operating mechanism for releasing said indicator upon the operation of any one of the justification-designating keys.

68. In a keyboard, the combination of the following elements, to wit; character-designating keys embodying a key or keys for designating characters having variable body widths; an indicating mechanism; connections between said indicating mechanism and the key or keys for designating characters having variable body widths, embodying a rack-bar, an operating-pawl and a holding-pawl; justification-designating keys and connections controlled by said justification-designating keys for releasing the holding-pawl of the indicating mechanism; substantially as described.

69. In a keyboard, the combination of the following elements, to wit; the character-designating keys embodying a key or keys for designating characters of variable body widths, keys for designating justification, a justification-indicator controlled by said character-designating keys for indicating the space occupied by characters of normal width; independent connections between said indicating mechanism and the key or keys for designating characters having variable body widths, embodying a rack-bar, an operating-pawl and a holding-pawl and connections controlled by the justification-designating keys for releasing said holding-pawl; substantially as described.

70. In a keyboard, the combination of the following elements; the character-designating keys embodying a key or keys for designating characters having variable body widths; a units-wheel controlled in its angular movement by said character-designating keys; a justification-arm controlled by said units-wheel; a justification-indicator mounted on said arm; a rack-bar on said justification-indicator; a pinion and shaft arranged axially of the justification-arm and carrying a second pinion; a vertically-movable rack-bar meshing with said second pinion; a rock-bar operated by the key or keys for designating characters of variable body widths, a pawl operated by said rock-bar and coöperating with the vertically-movable rack and a holding-pawl for said vertically-movable rack, with means for releasing said holding-pawl to reset the mechanism; substantially as described.

71. In a keyboard, the combination with character-designating keys and a units-wheel controlled in its angular movement by said character-designating keys, of a rack-bar arranged in horizontal guides, and adapted to advance in unison with the units-wheel, a supplemental rack also mounted in horizontal guides, a projection on the main rack for coöperation with the supplemental rack to move the latter at a predetermined point in the travel of the main rack, and an indicator moved by the supplemental rack with independent resetting mechanism for the two racks; substantially as described.

72. In a keyboard the combination with character-designating keys, a units-wheel controlled in its angular movement by the said character-designating keys, a rack-bar arranged in horizontal guides, and adapted to advance in unison with the units-wheel, a supplemental rack also mounted in horizontal guides, a projection on the main rack for coöperation with the supplemental rack, to move the latter at a predetermined point in the travel of the main rack, and an indicator moved by the supplemental rack, of a locking-pawl for locking the two racks together for unitary movement, a releasing-arm for said locking-pawl and resetting mechanism controlling said releasing-arm; substantially as described.

73. In a keyboard, the combination with character-designating keys and an indicating mechanism, embodying main and supplemental racks, arranged in horizontal guides with a projection on the main rack for engaging and moving the supplemental rack at a predetermined point, of an indicator moved by the supplemental rack, a pinion in mesh with said supplemental rack and a supplemental-rack and indicator resetting mechanism embodying a second rack in mesh with said pinion and means for moving said second rack; substantially as described.

74. In a keyboard, the combination with character-designating keys and an indicating mechanism embodying main and supplemental racks, arranged in horizontal guides with a projection on the main rack for engaging and moving the supplemental rack at a predetermined point, of an indicator moved by the supplemental rack, a pinion in mesh with said supplemental rack and a supplemental-rack and indicator resetting mechanism embodying a second rack in mesh with said pinion, a weight applied to said second rack and a spring-pressed lever coöperating therewith as set forth.

75. In a keyboard, the combination with character-designating keys, of an indicator embodying the following elements, to wit; a main rack with means for controlling its movement in accordance with the body widths of the type designated; a supplemental rack; a projection on the main rack adapted to coöperate with and move the supplemental rack at a predetermined point in the travel of the main rack; an indicator moved by the supplemental rack and a locking-pawl interposed between the main and supplemental racks for holding them in their correct relative positions while moving in unison; substantially as described.

76. In a keyboard, the combination with character-designating keys, of an indicator embodying the following elements, to wit; a main rack with means for controlling its movement in accordance with the body widths of the type designated; a supplemental rack; a projection on the main rack adapted to coöperate with and move the supplemental rack at a predetermined point in the travel of the main rack; an indicator moved by the supplemental rack; a locking-pawl interposed between the main and supplemental racks; a releasing-arm for said locking-pawl and a resetting mechanism for the main rack controlling said releasing-arm; substantially as described.

77. In a keyboard, the combination with the following elements, to wit; character-designating keys; justification-designating keys; a units-wheel having zero teeth or projections thereon and adapted to be released and controlled by said keys; an indicator controlled by said units-wheel and a zero-stop for resetting said units-wheel, thrown into operative position by the operation of any one of the justification-keys; substantially as described.

78. In a keyboard, the combination with the following elements, to wit; the character-designating keys; justification-designating keys; an indicator; a units-wheel controlling said indicator and itself controlled by the character-designating keys; a motor for said units-wheel; a ratchet connection between said motor and units-wheel; a resetting mechanism for the motor and a zero-stop for positioning the units-wheel controlled by the justification-designating keys; substantially as described.

79. In a character-designating apparatus, the combination with character-designating keys; justification-designating keys and an indicator controlling the units-wheel having a series of zero teeth or projections thereon, of a motor for impelling said units-wheel constantly in one direction, a ratchet interposed between the motor and units-wheel, with a resetting mechanism for the motor, and a zero-stop for coöperating with the teeth or projections on the units-wheel, and connections between the justification-designating keys and the zero-stop, whereby when said justification-keys are operated, the units-wheel is permitted to advance to a zero-point prior to the resetting of the motor; substantially as described.

80. In a character-designating apparatus, the combination with character-designating keys, justification-designating keys, a units-wheel, an indicator controlled by said units-wheel, and a motor for impelling said units-wheel in one direction, a zero-stop normally in position to arrest the units-wheel at a zero-point, a resetting mechanism for the motor and connections between the resetting mechanism and zero-stop for holding the stop out of operative position save when the resetting mechanism is being operated.

81. In a character-designating apparatus, the combination with character-designating keys, justification-designating keys, a units-wheel, an indicator controlled by said units-wheel, and a motor for impelling said units-wheel in one direction, a zero-stop normally in position to arrest the units-wheel at a zero-point, a resetting mechanism for the motor, connections between the resetting mechanism and zero-stop embodying a releasing-pawl and connections between the justification-designating keys and said releasing-pawl, whereby when the justification-keys are operated, the units-wheel will advance under the influence of its motor to a zero-point substantially as described.

82. In a character-designating apparatus, the combination with character-designating keys, justification-designating keys, a units-wheel, an indicator controlled by said units-wheel, and a motor for impelling said units-wheel in one direction, a zero-stop normally in position to arrest the units-wheel at a zero-point, a resetting mechanism for the motor, connections between the resetting mechanism and zero-stop embodying a releasing-pawl with means for holding said pawl out of engagement when released, and connections between said pawl and the justification-designating keys, whereby upon the operation of said justification-designating keys, the pawl is released, the units-wheel permitted to advance under the influence of its motor to a zero-point and further movement of the units-wheel prevented until the mechanism has been reset; substantially as described.

83. In a character-designating apparatus the combination of the following elements, to wit; key-controlled character-designating mechanism; an indicating mechanism embodying a horizontally-movable rack-bar; a line-scale indicator controlled by the rack-bar; a resetting mechanism for the rack-bar, and an adjustable stop for determining the normal position of the rack-bar or the length of the line; as set forth.

JOHN SELLERS BANCROFT.
    WILLIAM HENRY WOOD.

Witnesses:
 FRANK G. GRIER,
 E. R. HARPER.